United States Patent [19]
Millar et al.

[11] Patent Number: 5,297,276
[45] Date of Patent: Mar. 22, 1994

[54] METHOD AND APPARATUS FOR MAINTAINING DETERMINISTIC BEHAVIOR IN A FIRST SYNCHRONOUS SYSTEM WHICH RESPONDS TO INPUTS FROM NONSYNCHRONOUS SECOND SYSTEM

[75] Inventors: James P. Millar; Eddie B. Collins, both of San Jose; Ronald Weber, Sunnyvale; Clifford A. Petersen, San Jose, all of Calif.

[73] Assignee: Amdahl Corporation, Sunnyvale, Calif.

[21] Appl. No.: 814,389

[22] Filed: Dec. 26, 1991

[51] Int. Cl.$^5$ .................... G06F 11/00; G06F 13/00
[52] U.S. Cl. .................... 395/550; 395/575
[58] Field of Search ............ 364/DIG. 1, DIG. 2; 395/550, 575

[56] References Cited
U.S. PATENT DOCUMENTS 4,937,741  6/1990  Harper et al. .................. 364/200
5,005,174  4/1991  Bruckert et al. ................ 364/200

*Primary Examiner*—Robert L. Richardson
*Attorney, Agent, or Firm*—Fliesler, Dubb, Meyer & Lovejoy

[57] ABSTRACT

Determinism is maintained in a synchronous first system although the first system receives behaviorchanging signals from a second system running asynchronously relative to the first system. The second system refrains from sending behavior-changing signals to the first system until the first system stops its clock at a prespecified clock cycle and signals the second system of the event. The second system then downloads the behavior-changing signals into the first system and restarts the first system clock. The first system awakens to discover that the behavior-changing signals have been received during the prespecified clock cycle. This is repeated over multiple runs, and in each run the same behavior-changing signals are transferred at the same prespecified clock cycles of the first system. Deterministic behavior is thereby maintained in the first system.

15 Claims, 8 Drawing Sheets

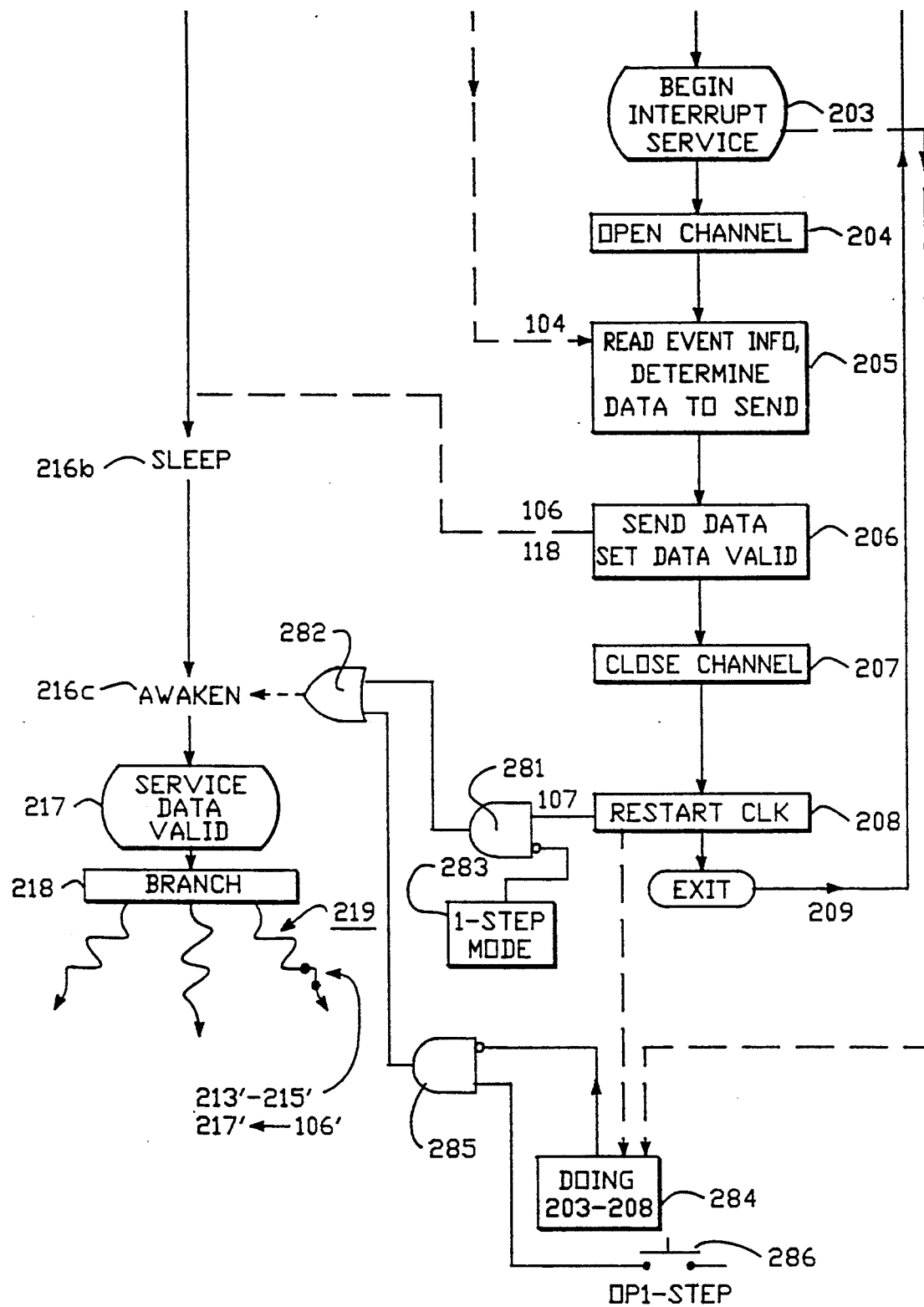
FIG.—2B

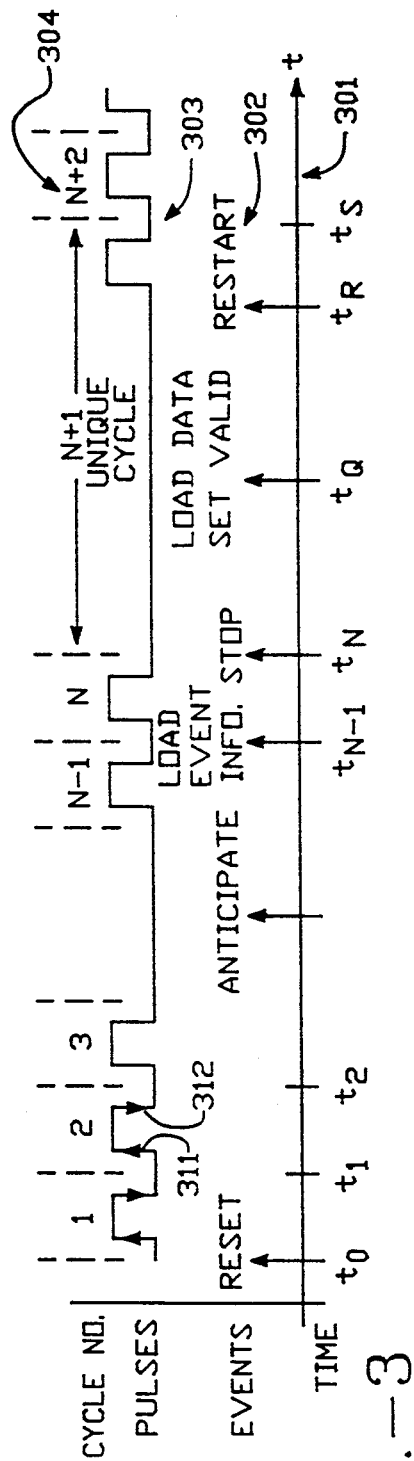
FIG.–3
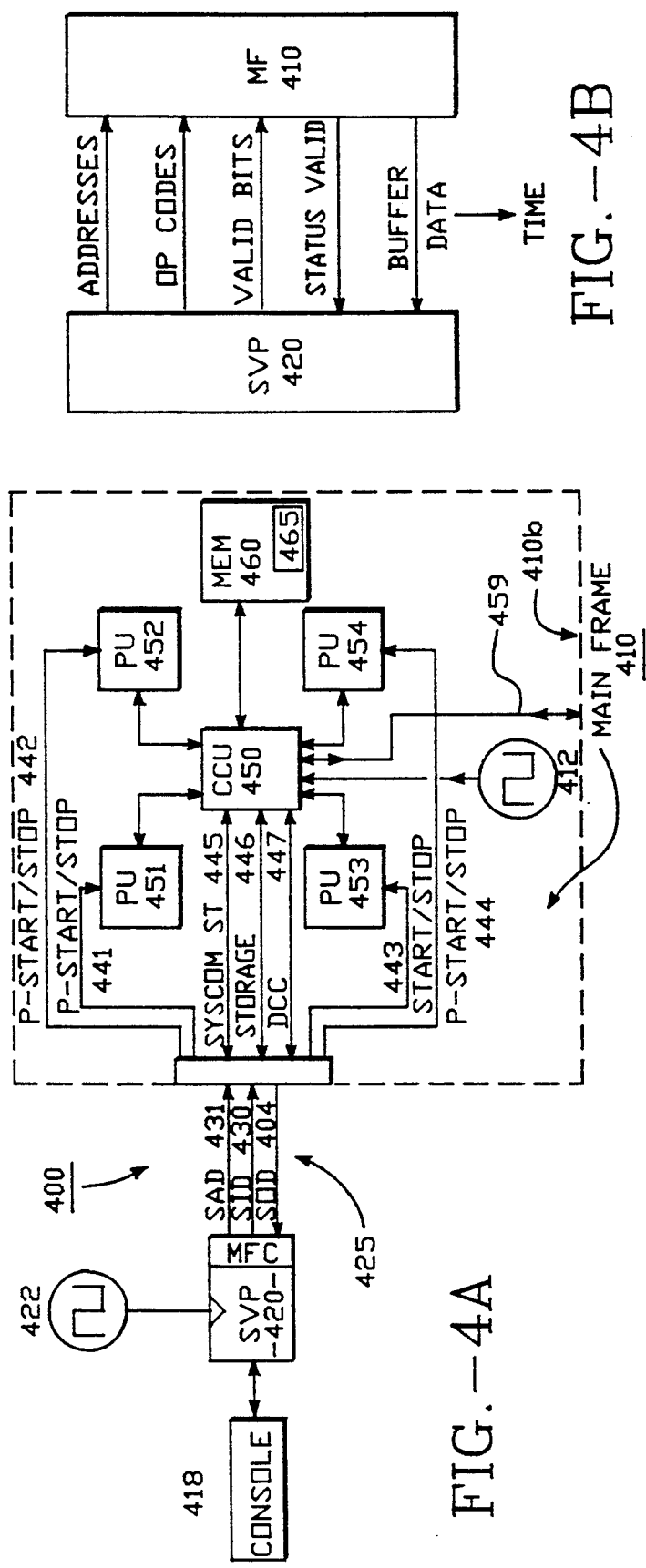
FIG.–4A
FIG.–4B

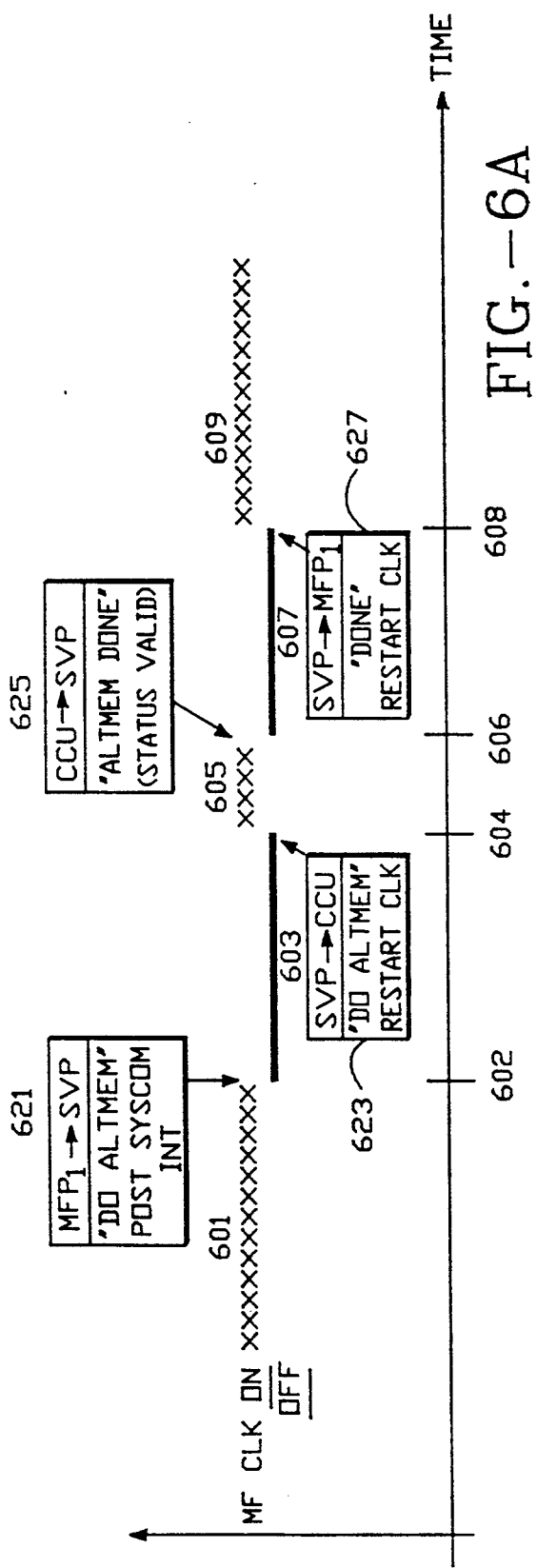
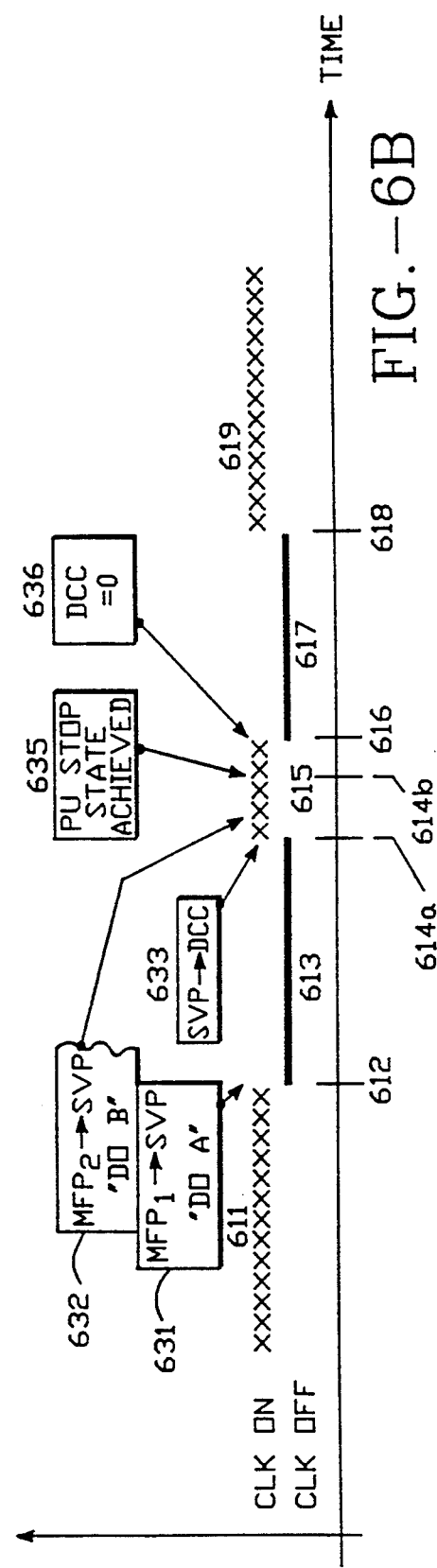
FIG.-6A
FIG.-6B

METHOD AND APPARATUS FOR MAINTAINING DETERMINISTIC BEHAVIOR IN A FIRST SYNCHRONOUS SYSTEM WHICH RESPONDS TO INPUTS FROM NONSYNCHRONOUS SECOND SYSTEM

BACKGROUND OF THE INVENTION

1. Field of the Invention

The invention relates to synchronous digital circuits. More particularly, the invention relates to a method and apparatus for achieving deterministic behavior in a first synchronous system which is clocked by a first clock generator where the first system responds to input signals from a second system which is not clocked by the first clock generator.

2. Cross Reference to Related Copending Applications

The present application is related to copending U.S. Pat. application Ser. No. 07/670,289 entitled "SCANNABLE SYSTEM WITH ADDRESSABLE SCAN RESET GROUPS", by Robert Edwards et al, which was filed Mar. 15, 1991 Said copending application is assigned to the assignee of the present application and its disclosure is incorporated herein by reference.

3. Cross Reference to Related Patents

U.S. Patents are assigned to the assignee of the present application and are further incorporated herein by reference: (A) U.S. Pat. No. 4,244,019, DATA PROCESSING SYSTEM INCLUDING A PROGRAM-EXECUTING SECONDARY SYSTEM CONTROLLING A PROGRAM-EXECUTING PRIMARY SYSTEM, issued to Anderson et al, Jan. 6, 1981; (B) U.S. Pat. No. 4,752,907, INTEGRATED CIRCUIT SCANNING APPARATUS HAVING SCANNING DATA LINES FOR CONNECTING SELECTED DATA LOCATIONS TO AN I/0 TERMINAL, issued to Si, et al. Jun. 21, 1988; (C) U.S. Pat. No. 4,819,166, MULTI-MODE SCAN APPARATUS, issued to Si et al Apr. 4, 1989; (D) U.S. Pat. No. 4,661,953, ERROR TRACKING APPARATUS IN A DATA PROCESSING SYSTEM, issued to Venkatesh et al, Apr. 28, 1987; (E) U.S. Pat. No. 4,835,728 DETERMINISTIC CLOCK CONTROL APPARATUS FOR A DATA PROCESSING SYSTEM, issued to Si, et al., May 30, 1989; and (F) U.S. Pat. No. 4,855,616, APPARATUS FOR SYNCHRONOUSLY SWITCHING FREQUENCY SOURCE, issued to Wang et al., Aug. 8, 1989.

4. Description of the Related Art

A deterministic system is one whose behavior may be exactly replicated one run after the next. Deterministic behavior is desireable in computer systems or other sequential state machines, especially during the debugging of software and/or hardware driven processes.

Each deterministic "run" of a sequential state machine takes that machine from a known initial state to a target state (e.g., the state in which an error condition is first recognized) by following substantially the same sequence of intermediate states as taken by other (previous or future) deterministic runs.

When a system is being debugged, the same software and/or hardware driven process is repeatedly executed while a system monitoring means collects information from a different parts of the system. In each execution, the monitoring means scans through the system looking for logic faults. When a fault is detected, the monitoring means tries to trace backwards both temporally and geographically from the point of detection to a point of origin to thereby discover when, where and how the fault first arose. If the system under test does not exhibit deterministic behavior, it would be difficult if not impossible to isolate the origin of system errors in this manner.

In many circumstances, the system which is to be tested (also referred to hereafter as the "main system") has to respond to input signals supplied from a nonsynchronously running second system.

The response of the main system to such input signals may define a substantial change in the behavior of the main system.

Maintaining deterministic behavior in the main system under such circumstances is difficult because a basic premise of determinism might be violated. The premise is that exactly the same inputs are delivered to the main system at exactly the same clock cycles, one run after the next. When a nonsynchronously running second system supplies behavior changing input signals to the main system, those signals can arrive at arbitrary times relative to the clock cycles of the main system and the behavior of the main system will not be exactly the same in every run.

SUMMARY OF THE INVENTION

It is an object of the invention to assure that a first synchronous system (main system) which is clocked by a main system clock receives exactly the same inputs at exactly the same cycle of the main system clock one run after the next even though some of its inputs come from an independently clocked or nonclocked second system.

In accordance with the invention, the second system refrains from sending behavior-changing signals to the main system until the main system first stops its own clock, at the start of one of a prespecified number of unique clock cycles, thereby putting itself into a selfinduced sleep. Before slipping into the self-induced sleep, however, the main system signals the second system of the event.

Behavior-changing signals, incidentally, are defined here as ones which might or definitely do induce changes in the behavior of the main system either immediately upon receipt or later in time. Operations within the main system are considered deterministic if the main system does not receive behavior-changing signals of arbitrary content from nonsynchronous external sources (from the second system) at arbitrary times. For every repeated run of main system operations, the main system should only receive prespecified inputs from nonsynchronous external sources only at unique, prespecified clock cycles of the main system.

Before each of the unique cycles is about to occur, the main system stores event-information in an event-buffer. The event-information indicates which of the prespecified number of unique cycles will next occur. Also, shortly before the unique cycle occurs, the main system causes an interrupt signal to issue to the second system.

The interrupt reaches the second system after the main system clock is turned off. At that time, all synchronous operations within the main system will have already come to a halt and the main system, in essence, will be in a self-induced sleep which freezes its state just as it was about to begin operations for the unique clock cycle.

Upon interruption, the second system reads the event-information out of the event-buffer and determines therefrom what input signals are to be next supplied to the main system. The second system then loads such input signals into an input-receiving buffer of the main system, and where communication protocols so require, it also sets a data-valid latch.

The second system then restarts the main system clock.

The main system awakens to find that it has received the input signals from the second system precisely at the beginning of the prespecified unique clock cycle and it processes them accordingly.

The second system refrains from sending any further behavior-changing input signals to the main system until the second system is again signalled by the main system that the start of a unique clock cycle and a clock stoppage event have occurred. In this way, the same behavior-changing signals arrive from the second system to be processed at precisely the same clock cycles of the main system one run after the next.

A glitch-free signalling circuit is also disclosed for allowing the first system to reliably signal the second system of a clock stoppage event. Other aspects of the invention will become apparent from the below detailed description.

BRIEF DESCRIPTION OF THE DRAWINGS

FIGS. 2A and 2B in combination, flowchart a set of cooperative interactions between a first program running in a main system and a second program running in a second system.

FIG. 3 is a timing diagram showing the relation between clock cycles of the main system and corresponding events in the main and second systems.

FIG. 4A is a block diagram of a second determinism maintaining structure in accordance with the invention which comprises a service processor (SVP) coupled to a multi-processor mainframe computer (MF).

FIG. 4B is a diagram showing an exchange of signals between the SVP and the mainframe of FIG. 4A.

FIG. 6A graphs a first clock stop/start servicing run.

FIG. 6B graphs a second clock stop/start servicing run.

DETAILED DESCRIPTION

Figure 1:
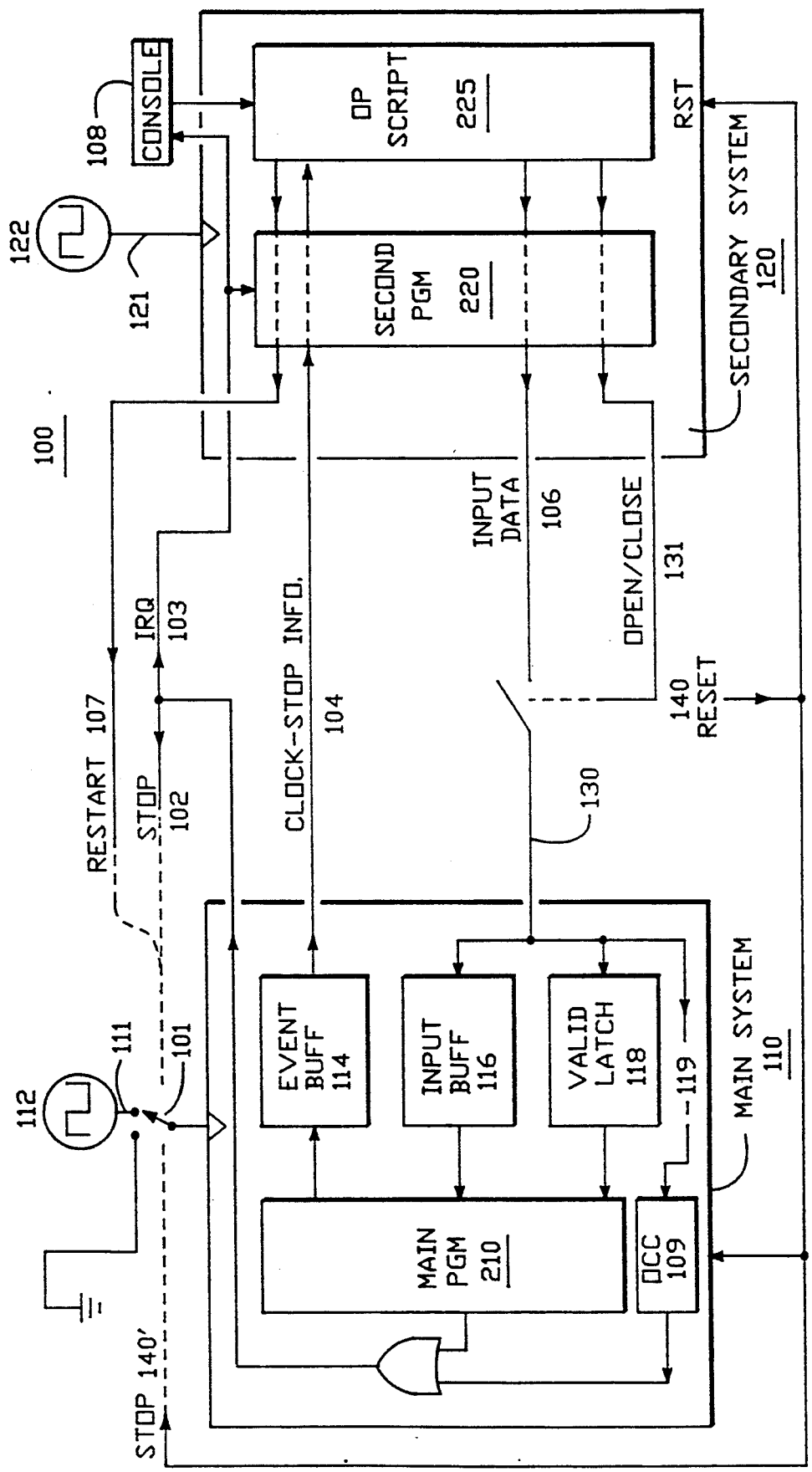
FIG. 1 is a block diagram of a first determinismmaintaining structure in accordance with the invention.

Referring to FIG. 1, a block diagram of a first determinism-maintaining structure 100 in accordance with the invention is shown. Structure 100 comprises a first synchronous digital system (.main system) 110 whose operations are synchronized by a first set of periodic clock pulses 11 supplied from a main clock generator 112.

Structure 100 further comprises a second digital system (second system) 120 whose operations may be either synchronized to a second set of periodic clock pulses 121 supplied from a second clock generator 122 or not synchronized at all, or sometimes synchronized to the second clock generator 122 and sometimes not.

The second clock generator 122 operates independently of the first clock generator 112 and typically runs at a slower frequency. In some instances (e.g., single-step debugging of the main system), the second clock generator 122 operates at a higher frequency. As a general rule, operations within the second system 120 are nonsynchronous relative to operations in the first system 110.

A blockadable data channel 130 couples a datasupply means 220 and/or 225 in the second system 120 to a data-receiving buffer 116 in the main system. The data channel 130 also couples the supply means 220 and/or 225 to a data-valid indicating latch 118 and to other input-receiving points 119 within the main system 110. One of the other input-receiving points within the main system 110 is an Operator's Cycle Counter (OCC) 109 which will be discussed later.

The second system 120 controls the blockading of the data channel 130 by way of a channel control 131. When channel 130 is open (not blockaded), data signals can flow from the second system 120 into the first system 110. When channel 130 is closed (blockaded), data signals are blocked from flowing into the first system 110. Channel blockading can be implemented through software restraints or hardware switches or a combination of both.

When the main system 110 is up and running (when it is receiving clock pulses 111 from its clock generator 112), its behavior can be altered by data loaded into data-valid latch 118. If the data-valid latch 118 is set to a logic true state (switched from a logic "0" state to a logic "1" state), this indicates to the main system that valid data requiring either immediate or later attention is waiting in the corresponding datareceiving buffer 116.

The data-valid latch 118 acts essentially as an interrupt request latch. Depending on the priority level assigned to data-valid latch 118, the main system 110 might be forced to immediately interrupt other tasks it is performing (unless a higher priority interrupt is being serviced) and to process a command or request stored within the input buffer 116 or to, at a later time, process the data stored in input buffer 116.

For the case where no higher priority interrupts are being serviced in the main system, and the setting of latch 118 forces the main system to immediately interrupt other, lower-priority tasks then being performed, it can be said that the setting of the datavalid latch 118 induces an immediate change in the behavior of the main system 110. For the case where higher priority non-interruptable tasks are being serviced in the main system, the setting of the datavalid latch 118 can induce latent changes in the behavior of the main system 110.

It is not always clear at the time when data is sent to the main system and the data valid latch 118 is set by a nonsynchronous external source (e.g., by the second system 120), whether a substantial change of behavior will definitely be induced within the main system 110 either immediately, or latently, or ever. For example, the servicing of a higher priority interrupt within main system 110 might clear latch 118 before its interrupt is serviced. The servicing of a logic one ("1") within data-valid latch 118 might invoke a parallel function within the main system 110 which does not alter the behavior of operations within the main system for which determinism is desired. On the other hand, it might.

As long as there is some remote possibility that the setting of latch 118 by an external, nonsynchronous source might change the behavior of a given process within main system 110 and it is desireable to make that given process deterministic, the setting of latch 118 has to be itself restricted so that it is deterministic one run after the next. Otherwise, questions are raised about the determinism of all other main system process.

Since the second system 120 can set the data-valid latch 118 at arbitrary points in time, and thereby potentially alter the behavior of main system 110, and since the second system 120 can also send other potentially behavior-affecting signals into the main system through input path 119 at arbitrary times, the problem at hand is how to maintain deterministic behavior for processes executing within the main system 110 even though such processes can be forced to respond immediately or latently to commands or requests sent from the second system 120 into the main system 110 at arbitrary times.

In accordance with the invention, when deterministic behavior is desired within the main system 110, the second system 120 refrains from sending potentially behavior-changing signals at arbitrary times to the main system 110. A signal is considered to be potentially behavior-changing if there is any substantial likelihood that such a signal might alter the behavior of the main system 110 in a way which makes its operations nondeterministic.

A clock control means 101 is provided for selectively turning on and off the supply of clock pulses 111 from the first clock generator 112 to the main system 110 at prespecified cycle counts of the first clock generator 112.

Clock control means 101 responds to a stop command 102, supplied from the main system 110, by turning off the supply of clock pulses 111 to the main system 110 a predetermined number of clock cycles after it receives the clock stop command 102 from the main system (e.g., immediately thereafter or one clock cycle thereafter or eleven cycles after). The clock control means 101 further responds to a restart command 107, supplied from the second system 120, by turning on the supply of clock pulses 111 to the main system 110.

Both the main and second systems, 110 and 120, begin operations in predefined initial states when they receive a master reset signal 140. The master reset signal 140 couples to the clock control means 101 as indicated at 140, and switches control means 101 to a first clock stop state whenever a system reset occurs. This blocks the supply of clock pulses 111 to the main system 110 and brings all synchronous operations within the main system 110 to a halt. The main system is thus placed in a pre initialization first sleep state (201a in FIG. 2A).

The second system 120 continues to receive clock pulses 121, and thus remains awake. Upon receipt of the reset signal 140, the second system 120 begins to execute a reset service routine (steps 221-228 of FIG. 2A) in which it opens the blockadable channel 130 and downloads initialization data into the main system 110 through the opened channel 130 and through path 119 so as to reconfigure memory contents and operating state latches (not shown) within the main system.

Figure 2A:
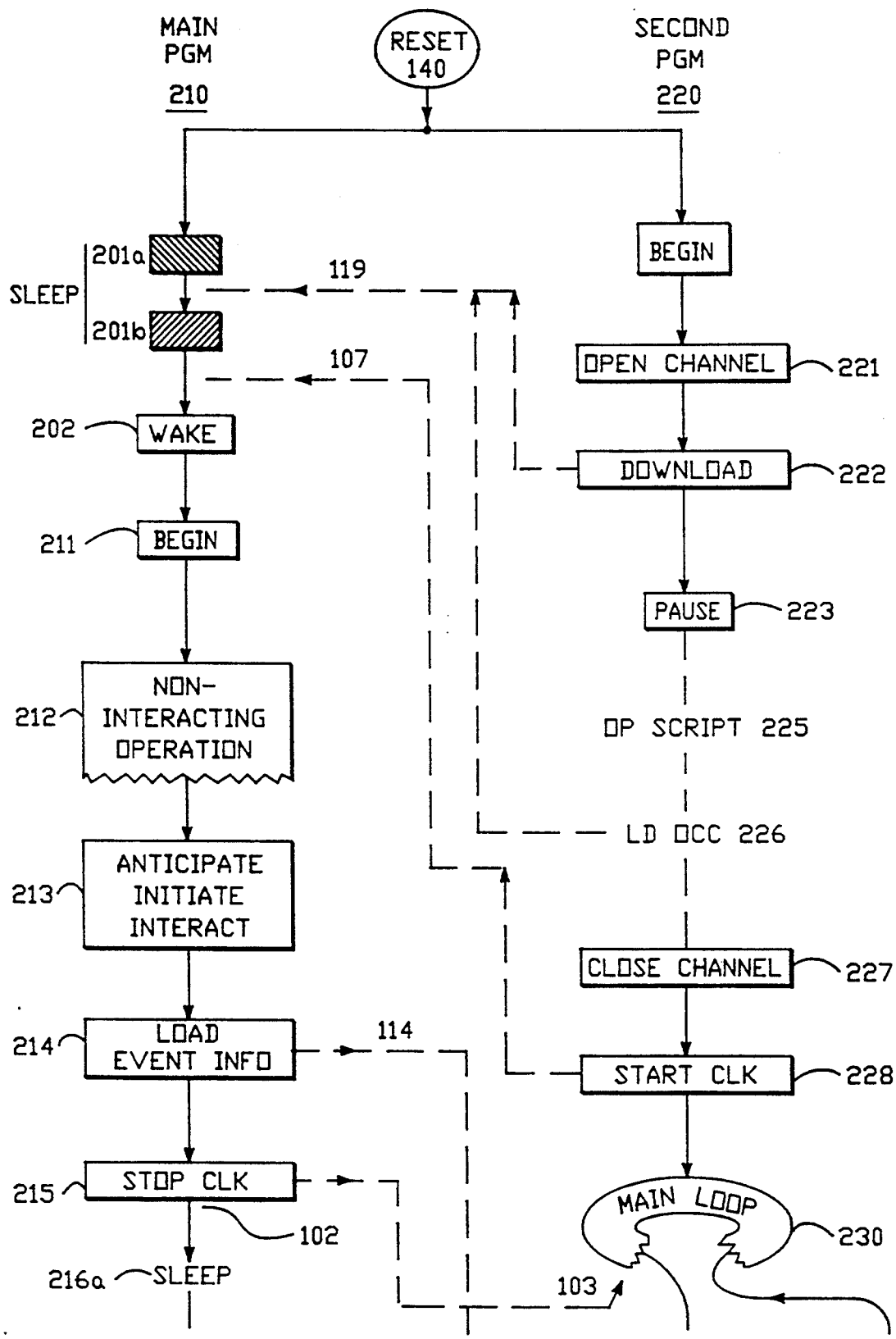

The downloading step (222) places the main system in an initialized second sleep state (201b of FIG. 2A). The second system 120 then closes channel 130 and sends a clock restart command 107 to the clock control means 101.

When the main system 110 begins to receive the restarted clock pulses 111, the main system awakens. As it comes out of the second sleep state (201b), it finds itself reconfigured in accordance with the initialization data downloaded from the second system 120. The main system 110 moves out of its reconfigured second sleep state to an operating state, with each step of the awakening process proceeding in synchronism with clock pulses supplied from its clock generator 112. At the same time, the second system 120 continues to operate in independent synchronism with its own clock generator 122, but refrains from sending behavior changing signals to the main system on its own initiative.

As long as the blockadable channel 130 remains closed (blockaded) such that further external nonsynchronous signals cannot enter into the main system 110, the behavior of the main system can be guaranteed to be deterministic relative to the second sleep state (201b) from which it just awoke.

Of course, a time will come, after the main system 110 wakes up, when the main system 110 wants to or is forced by external events to accept input data 106 from either the second system 120 or from another nonsynchronous external source (e.g., the system operator).

In accordance with the invention, the main system either initiates the delivery of input signals from each nonsynchronous external source or anticipates such delivery shortly before it actually occurs. The main system takes steps before the data delivery to assure that the externally-supplied input data will arrive at a same predefined, unique clock cycle (as measured from the post-reset awakening), one run after the next. (For the sake of example, the predefined, unique clock cycle will be referenced here as cycle number "N+1". See FIG. 3.)

The main system 110 includes an event buffer 114 which can be read by the second system 120 even when clock pulses 111 to the main system are halted. Just before the predefined, unique clock cycle N.1 is about to occur within the main system 110, the main system 110 prepares to initiate or anticipates the upcoming input delivery event. The main system 110 loads clock-stop event information 104 into the event buffer 114 which will indicate to the second system shortly thereafter (after the main system clocks shut down again) that the main system has reached the beginning of the unique clock cycle N+1. The main system 110 issues a stop command 102 to the clock control means 101 a predetermined number of clock cycles before the prespecified unique clock cycle (N.1) is about to begin (e.g., zero to sixteen cycles before) so that the clock control means 101 will turn off the supply of clocks 111 and halt all synchronous operations in the main system 110 just as the main system is about to begin operations belonging to the unique clock cycle N+1.

The stop command 102 which issues to the clock control means 101, in most instances, is accompanied by an interrupt signal 103 which issues to the second system 120. Interrupt signal 103 interrupts whatever tasks are being performed by the second system 120, and forces the second system 120 to execute a clock-stoppage service routine 203 (FIG. 2B) which ultimately revives the main system 110.

An exception to this rule is where the stop command 102 results from a count down to zero by the Operator's Cycle Counter (OCC) 109. The main system 110 stops receiving clock pulses 111, but the secondary system 120 is not interrupted by an IRQ signal 103 and it is not made responsible for reviving the main system 10. Instead, an indicator flashes on the system operator's console 108 to indicate that main system clocks have stopped. The system operator can then initiate an operator's script 225 which opens channel 130 and sends input data 106 into the main system 110. The operator can also manually reconfigure the internal state of the main system 110 as desired at this time (in the same manner for each run). It is the operator's responsibility to close channel 130 and to send a restart command 107 for reviving the main system 110 at the end of each such operator interaction with the main system.

In terms of an analogy, it could be said that the main system arms an alarm clock to go off precisely at the beginning of cycle N.1. It writes a suicide note (into buffer 114) and puts itself into what could be a permanent sleep knowing that when the alarm clock rings, the second system (or the system operator) will be alerted, the second system (or the system operator) will read the suicide note, apply an appropriate input into the main system and then resuscitate the main system.

This sequence of events will be examined now in further detail. Assume first that the main system 110 issues a stop command 102 to clock control 101 and an IRQ signal 103 to secondary system 120. As the second system 120 begins to respond to IRQ 103, by executing interrupt service routine 203 (FIG. 2B), it reads the event information 104 stored in the event buffer 114 (FIG. 1), opens the data channel 130, and based on the clock-stop event information 104 just obtained, it loads corresponding input data 106 into the main system 110 by way of the just opened channel 130.

For example's sake, let it be assumed that the event information 104 instructs the second system 120 to load input data 106 into the data-receiving buffer 116 of the first system and, when the data-receiving buffer 116 is fully loaded, to set the data valid latch 118 of the main system to a logic true state.

The second system then closes (blockades) the data channel 130 and issues a restart command 107 to the clock control means 101.

Operations in the main system 110 resume and the data loaded into the data-receiving buffer 116 is processed by the main system 110 as the main system awakens and services the interrupt requested by latch 118.

Referring to FIGS. 2A and 2B, the above operation will be described in yet more detail. Each of the main and second systems 110 and 120 is loaded with a respective one of first and second inter-cooperating programs, 210 and 220.

The second program 220 was earlier referred to as one of the data supply means 220 and/or 225 for supplying data to path 119 and/or buffer 116 and latch 118. The other data supply means 225 is the system operator or the operator's script. The operator or operator's script can reconfigure the main system at any time. But according to the invention, they refrain from sending reconfiguration data into the main system 110 at all times except when the main system halts itself, (by way of an OCC 109 time out, for example).

Instructions for the first and second intercooperative programs, 210 and 220, are typically stored in respective memory means (not shown) of the main and second systems and executed by execution units (not shown) of these systems.

When the master reset signal 140 is received, the clock control means 101 responds by shutting off clock pulses 111 to the main system 110 and thereby puts all synchronous operations within the main system into the earlier-mentioned, first post-reset sleep state 201a.

The second system 120, which remains awake, responds to the reset 140 by executing a power-up/reset service routine (steps 221-228) in which it begins by opening channel 130 (step 221) and downloading initialization data (step 222) into the main system 110. The downloaded initialization data typically flows to the other input-receiving points 119 earlier mentioned and reconfigures the state of the main system 110. The downloaded initialization data should be substantially the same in every run for which determinism is to be maintained.

Next, the secondary program 220 enters into a pause state 223 wherein it waits for approval from the system operator to proceed to step 227. The system operator can change the configuration of the main system 110 during this pause step 223 either by way of commands manually entered through the system console 108 (FIG. 1) or by way of an operator script program 225 executed during pause 223.

Among the configuration changes that the system operator can make during pause step 223 is to switch the main system 110 between a single-step (1-step) made and a full-speed mode. Latch 283 is set when 1-step mode is active.

The system operator can also load a cycle count into the operator's cycle counter (OCC) 109. If the operator intends to interact with the main system 110 in any way after pause step 223, it is recommended that he/she load the OCC now, during pause step 226.

When clocks are turned back on, in upcoming step 208, the OCC 109 will decrement its stored value on each machine cycle of the main system 110, and at the end of the count down, it will issue a clock stop command 102. At that time, an indicator on the system console 108 will cue the operator, telling him/her that the main system has stopped at a unique clock cycle. The operator will then be allowed to input additional data into the main system 110 and to re-arm the OCC 109. As long as the operator later supplies the same inputs at the same clock cycles, one run after the next, the runs should be deterministic.

Once the operator completes his/her reconfigurations within pause step 223, the operator signals the second system 120 to proceed to step 227.

The reconfigurations carried out in downloading step 222 and pause step 223, will have put the main system 110 into a second post-reset sleep state, as denoted by 201b in FIG. 2A. This second sleep state 201b should be the same one run after another.

Next, the second system 120 closes the channel (step 227) and proceeds to step 228.

In step 228, the second system 120 sends a clock restart command 107 to the clock control means 101 so as to awaken the main system out of its second post-reset sleep state 201b.

As the main system 110 begins to wake up (step 202), the second system 120 continues to execute its own, independent operations. The second system 120 enters a main program loop 230 in which it continuously polls the state of the clock control means 101 and in which it performs other tasks not affecting the determinism of operations commencing in the awakening main system 110.

The data downloaded in steps 222 or 223 should have reconfigured the main system 110 to begin executing some specific program 210. This program 210 starts executing at BEGIN step 211 as the main system awakens (202). BEGIN step 211 directs the main system into a first stream of "non-interactive" operations 212 wherein inputs from nonsynchronous external systems (the second system 120, or the system operator, or any other input means that is not synchronized to every pulse of the main clock 112) are neither accepted nor responded to. The behavior of the main system 110 is thus guaranteed to be deterministic at least from the time between the post-reset awakening 202 through all operations performed in first stream 212.

At step 213, the main system either prepares to initiate a soon-to follow interaction (FIG. 2B, steps 206 and 217 combined) with an external nonsynchronous device (e.g., with the second system) or the main system 110 anticipates that such an interaction (206 and 217 combined) will be shortly forced upon it. In the anticipated and/or initiated steps 206 and 217 that are upcoming, the main system 110 will have to receive externally-generated data and potentially alter its behavior in response to the received data.

The main system 110 attempts to keep its own behavior deterministic by trying to make sure that the upcoming interaction (206 and 217 combined) will occur a same number of clock cycles after the post-reset awakening 202 (e.g., at cycle number N.1) one run after the next, and that the same data will be received in the upcoming interaction (206 and 217 combined), one run after the next. If this constraint is maintained, the behavior of the main system should remain deterministic after each interaction (206 and 217 combined) with a relatively nonsynchronous external data source (e.g., second system 120).

At step 215, the main system 10 issues a stop command 102 which causes the clock control means 101 to halt the clock pulses 11 just as a prespecified unique cycle number (e.g., N.1) is about to begin. This assures that the upcoming interaction (206 and 217 combined) will begin at the prespecified unique cycle number (e.g., N+1).

Step 215 does not of itself guarantee that the same data will be received in the upcoming interaction (206 and 217 combined), one run after the next. So before the main system 110 slips into a self-induced, third post-reset sleep state, 216a, the main system 110 also loads clock-stop event information at step 214 into buffer 114 to indicate to the second system 120 what input data 106 the second system 120 should supply during the anticipated interaction (206 and 217 combined). The dashed line leading from "EVENT INFO" step 214 to box 205 ("READ EVENT INFO" of FIG. 2B) indicates that the information stored in step 214 will be retrieved in a soon-to-be described step 205.

The event information loading step 214 preferably occurs before the clock-stop command issuing step 215 so as to assure completion of the loading step 214 before the main system clocks actually stop, but the order of steps 214 and 215 could be reversed if there is enough latency between the command issuance step 215 and the actual clock stoppage at step 216a.

If step 213 is primarily an interaction anticipating rather than interaction initiating step (system 110 does not request the 206 and 217 combined interaction, but just the same system 10 knows that the interaction, 206 plus 217, will be soon forced upon it, within say, the next 100 milliseconds), then preparation steps 213-215 should occur well before the anticipated interaction (206 and 217 combined) to assure that the interaction (206 and 217 combined) does not begin before the selfinduced sleep state 216a is attained.

If on the other hand, step 213 is primarily an interaction initiating step (system 110 actively requests the upcoming interaction, 206 and 217 combined, and thus inherently knows that it is upcoming), then step 213 can be deleted as a distinctive step from the flowchart (FIG. 2A) and the initiating function of step 213 can be combined into step 215 while the anticipating function of step 213 can be combined into step 214. Clock stopping step 215 can of itself initiate the interaction (206 and 217 combined) in place of the deleted initiating step 213 because step 215 generates interrupt request (IRQ) signal 103 and that in turn initiates a service routine 203 in the second system (to be described shortly).

Referring briefly back to FIG. 1, one kind of interaction (206 and 217 combined) which the main system could initiate is one where the main system 110 asks the second system 120 to reconfigure the main system 110 in step 206 such that, upon awakening, the main system 110 is forced into an immediately responsive action. At step 214, the main system 110 might load event buffer 114 with a message asking the second system 120 to send input data into buffer 116 and to set the data-valid latch 118 to logic true. Step 215 initiates the clockstoppage service activity 203 (to be described shortly) within the second system 120 and puts the main system 110 to sleep at following step 216a.

When the main system later awakens at step 216c, the logic true state of the data-valid latch 118 forces the main system 110 to service the data-valid condition (interrupt request) and to perhaps execute a particular branch operation 218 immediately or a fixed time after or a fixed number of cycles after the main system detects the logic true state of the data valid latch 118.

The input data that is detected within buffer 116 at step 217 may be used to dictate which path 219 will be chosen in branch operation 218. If the data-valid servicing step 217 and responsive step 218 were allowed to occur an arbitrary number of cycles after reset 140, the main system might exhibit nondeterministic behavior. But since the main system 110 stops its own operations at the beginning of a prespecified unique clock cycle (e.g., N+1), the combined interaction of step 206 plus 217 always begins at that clock cycle and the subsequent behavior (steps 218, 219) of the main system remains deterministic.

With the exception of some tasks which might be directly affected by soon-to-be described step 206, none of the tasks executing within the main system at the time of third sleep state 216a are aware that this third sleep state 216a has occurred, or that a transition to a fourth sleep state 216b (soon-to-be described) has occurred, and they continue as if it never happened when, a short time later, the main system 110 is reawakened at step 216c by the second system 120.

As already mentioned, the clock stop command 102 issued at step 215 is accompanied by an interrupt signal 103 to the second system 120. The latter signal 103 interrupts the main program loop 230 of the second system and passes control to a corresponding interrupt service routine 203. The interrupt signal 103 can be of a hardware nature or it could be recognized by a software polling function within main loop 230. Regardless of its nature, interrupt signal 103 should be preserved and prioritized so as to prevent the second system 120 from forever ignoring a clock stoppage event (215, 216a) in the main system 110.

As it begins executing service routine 203, the second system 120 sets a "doing 203-208" latch 284 to indicate that it has entered the series of steps labelled 203 through 208. The significance of this will become apparent in due course.

At step 204 of the service routine, the second system opens the data channel 130. At step 205 the second system reads the clock-stop event data 104 out of the event buffer 114 and determines from this what input data 106 it should next load into the main system (e.g., into data-receiving buffer 116).

At step 206 the second system loads the indicated input data 106 into the main system (e.g., into datareceiving buffer 116) and if communication protocols so require, it sets a corresponding data-valid bit in the main system (e.g., interrupt latch 118) to indicate that valid data is waiting in the just-loaded buffer. Loading step 206 moves main system 110 from its third post-reset sleep state 216a to the fourth post-reset sleep state 216b. (Main system 110 is now loaded with new data 106 and is therefore in a new state.)

While not shown, it is to be understood that downloading step 206 can be expanded or replaced by the general step of sending any kind of signal into the main system, where that signal changes the state of the main system in a manner which might affect the determinism of the main system 110. This includes signal inputs from other systems (not shown) or from the system operator.

At step 207 the second system closes the blockable data channel 130.

At step 208 the second system 120 resets the "doing 203-208" latch 284 and issues a clock restart command 107 to the main system clock control 101 by way of logic devices 281 and 282.

The clock restart command 107 of step 208 reaches the clock control 101 only if 1-step mode latch 283 indicates that the main system 110 is in a continuous run mode rather than in a single step mode.

If 1-step mode latch 283 has been previously set by the system operator during pause step 223, a logic AND device 281 blocks the clock restart command 107 from reaching clock control 101.

During single-step mode, the system operator can advance the main system 110 to a next machine state by sending a single-step command 286 through logic AND device 285 and logic OR device 282 to the clock control mechanism 101. Each single-step command 286 steps the main system forward by one cycle. The operator controls the number and frequency of single step commands 286 which he/she sends to the main system clock control 101.

The "doing 203-208" latch 284 is provided to block single stepping of the main system 110 while the main system is in the special sleep state of steps 216a through 216b and while the second system 120 is busy performing the data-downloading operations of steps 203 through 208. The second system 120 should be permitted to complete transmission of all its step 206 data to the main system 110 during this special state (during onset of special cycle "N+1",see FIG. 3) without interruption from the system operator. If the system operator were allowed to interfere with the execution of steps 203-208, the behavior of main system 110 might become nondeterministic.

Devices 281-286 can be implemented by way of software or hardware as desired.

When the main system 110 receives either the restart-clocks command 107 or a single-step forward command (286), it proceeds to step 216c where it awakens to execute operations of special machine cycle ("N+1" of FIG. 3). At this time, the main system 110 finds that it has received the input signals of step 206.

Upon completing steps 203-208, the second system 120 exits the interrupt service routine 203 and returns to the main loop 230 at the point where it was interrupted by the IRQ signal 103.

As mentioned, the main system 110 is deemed to be reawakened at 216c. It enters the reawakened state 216c either when it receives the restarted clock pulses 111 or when it receives one or a series of single-step commands 286 from the system operator. The data-valid bit (e.g., the interrupt request signal in latch 118) which was set by second system step 206 while the main system was asleep, eventually forces the main system 110 to process the downloaded input data 106 at step 217. (Latch 118 is reset when its interrupt is acknowledged and acted upon.)

Typically, the servicing 217 of the data-valid signal (stored in latch 118) and the processing of the accompanying input data 106 in the data-receiving buffer (116) will initiate a branch operation 218 or a similar change in the behavior of the main system, driving the main system behavior into a new path 219. Somewhere along new path 219, another interaction (217'←106') with the second system 120 will be forced in a manner similar to that of the first described interaction (206 and 217 combined). The timing of this next interaction (217'←106') relative to reset 140 will also have to be at a pre-fixed cycle number. This is necessary in order to further maintain deterministic behavior in the main system one run after the next.

Typically, there will be an error condition at the end of path 219 which system debuggers are trying to reproduce in each run. With the exception of intermittent error sources, the conditions which bring about the error condition should be reproducible one run after the next as long as all state transitions between reset point 140 and the end of path 219 occur substantially in the same way and at the same machine cycles, one run after the next.

Although FIG. 2 shows the details of only one set of interaction initiating/anticipating and clock stopping steps 213, 214, 215, it is to be understood that many similar steps (e.g., 213'-215') are appropriately scattered throughout the first program 210 to fixedly position the cycle of occurrence of these other interactions (e.g., 217'←106') relative to the reset event 140. The interaction initiating/anticipating and clock-stopping steps 213'-215' assure that exactly the same input data 106' will arrive for processing at exactly the same main system clock cycle for each run of first program 210. The main system 110 then exhibits deterministic behavior one run after the next.

FIG. 3 is a timing diagram showing the relation between real time, clock cycles of the main system and the above described steps for the case where the main system 110 is running at full speed in the deterministic mode (the main system clock pulses are periodic and at their maximum frequency) and the secondary system 120 is running at a slower speed with operations of the secondary system 120 occurring nonsynchronously relative to the periodic clock pulses 111 of the main system.

The real time line is shown at 301. Events shown at 302 are positioned relative to the time line 301. Corresponding main system clock pulses 111 are shown at 303. And the cycle numbers for these clock pulses are shown at 304. Each clock cycle is defined by a clock pulse having one rising edge 311 and one falling edge 312. Typically, at least one of edges 311 and 312 is considered a transition-inducing edge because it induces transitions in the states of synchronous circuits within the main system 110.

Clock cycle number "1" is defined by the first clock pulse which follows a master reset 140 at time point $t_0$, as shown in FIG. 3. Clock cycle number "1" ends at first time point, $t_1$. It is followed by clock cycle number "2" which correspondingly ends at second time point, $t_2$. These cycles are sequentially followed by further clock cycles "3", "4" and so forth, each having the same duration, $t_2 - t_1$, as cycle "1" until at time point, $t_N$, the beginning of a unique clock cycle "N+1" is reached.

Before the unique clock cycle "N+1" begins, the above-mentioned anticipatory or initiating operations (213-215) take place. At the end of clock cycle number "N" (time point $t_N$), the main system must be finished with loading the event-buffer (step 214). Step 214 can occur one or a few or many cycles before unique clock cycle "N+1" begins.

At the close of clock cycle number "N", the clock-stop command 102 is obeyed and clock pulses 111 stop. This temporarily breaks the periodicity of the main system clock pulses 303 which had been maintained from reset time $t_0$ to the end point $t_N$ of cycle number "N".

Unique clock cycle number "N+1", is nonperiodic because it is longer than any of the preceding cycles, "1" to "N". The "N+1" clock pulse does not arrive until after the second system 120 responds to interrupt 103, loads data 106 into buffer 116, sets the data-valid latch 118 (at time point $t_Q$) and issues a restart command 107 (at time point $t_R$). Since the second system 120 is presumed in this example to be running at a much slower speed than the main system 110, the unique clock cycle "N+1" is much longer than preceding cycles 1 to N.

After unique clock cycle number "N+1" completes (at the beginning of the next cycle, number "N+2", which immediately follows the end point $t_S$ of the special cycle "N+1"), the clock pulses 303 become periodic once again until a next unique, extended clock cycle (such as "N+1") is produced by further program steps similar to 215 and 203-208 of FIG. 2.

It has been assumed until this point that only one task or "thread" (such as 211-219 of FIG. 2) is running at any one time within main system 10. It has been further assumed that second system 20 interacts with the main system 110 only at singular, independent event points (217, 217') distributed along the one thread 211-219.

Modern high-performance machines usually process multiple threads concurrently. Special problems arise from such concurrency. For example, events in some threads interact with those of other threads and this can produce an undesirable deadlock condition. A single thread model does not reveal problems encountered in multi-thread environments. This is because single thread models do not run into the deadlock problem wherein two halted threads are each waiting for a restart signal from the other. A more complex methodology is needed for maintaining determinism in multi-thread environments and, more particularly, for avoiding deadlock conditions.

Referring to FIG. 4A, a block diagram of a second determinism-maintaining structure 400 in accordance with the invention is shown. Like reference numbers within the "400" series are used in FIG. 4A for elements having like counterparts numbered in the "100" series in FIG. 1.

Structure 400 comprises a multi-processor mainframe computer (main system) 410 whose operations are synchronized to pulses generated by a main clock generator 412. Structure 400 further comprises a service processor or "SVP" 420 (second system) whose operations are synchronized to pulses generated by a second clock generator 422. The SVP 420 includes a mainframe control interface (MFC) for interfacing with the mainframe computer 410.

The second clock generator 422 operates independently of the first clock generator 412 and typically runs at a much slower frequency. In one embodiment, the first clock generator 412 has a 7 nanosecond period (7 nS) while the second clock generator 422 operates with a 50 nS period. Thus there is roughly a seven to one speed differential between synchronous processes taking place within the mainframe 410 and operations taking place within the service processor 420.

Notwithstanding the above, there are occasions when mainframe operations run slower than SVP operations. This happens, for example, during debug runs in which the mainframe is single-stepped through certain routines while programmers try to identify the exact point where errors begin to infect mainframe operations. It is preferable to maintain determinism in the mainframe during debug runs irrespective of the speed at which the mainframe runs (high speed or single-stepped) so that the same conditions can be recreated one debug run after the next, even if the speed of each run is hastened or slowed down at different parts of the run. A same run is typically repeated many times with breakpoint placed at different points until the cause of an error condition is found out.

While deterministic runs are desirable for debug purposes, it is to be understood that system 400 can also operate in a mode where its behavior is not deterministic and that such a nondeterministic modality is possible both during normal operations and debug runs. The console operator is provided with a choice of placing system 400 in either a determinism-assuring mode (hereafter also referred to as the "deterministic mode") or a mode which could be nondeterministic (hereafter also referred to as the "nondeterministic mode"), as desired. During the determinism-assuring mode, certain hardware and software configurations are selected, as will be further explained, to assure deterministic behavior in the mainframe portion 410.

A system console 418 couples through the service processor 420 to the mainframe 410. System operators can send console commands to the mainframe 410 through this coupling, including commands which place the mainframe 410 in either a deterministic mode or a nondeterministic mode. System operators can also direct error isolation processes which are executed from the SVP 420 by way of the system console 418.

The mainframe computer 410 (also referred to as "MF" hereafter) includes a central control unit (CCU) 450 which couples to four surrounding processor units (PU's) 451, 452, 453 and 454.

The mainframe 410 also includes a central memory unit (MEM) 460 which couples to the CCU 450 and is used for storing system data. A "SYSCOM Queues" area 465 is provided within memory unit for storing four SYSCOM queues. The queues are referred to as the "Response priority" queue, the "Low priority"

queue, the "Normal priority" queue, and the "Recovery priority" queue. (See FIG. 5A.) Message packets of corresponding priority are loaded into this area 465, and ordered in each queue on a first-in first-out (FIFO) basis to wait for their turn to pass through the CCU 450 and into the SVP 420. This queuing mechanism will be discussed in more detail later below.

Figure 5A:
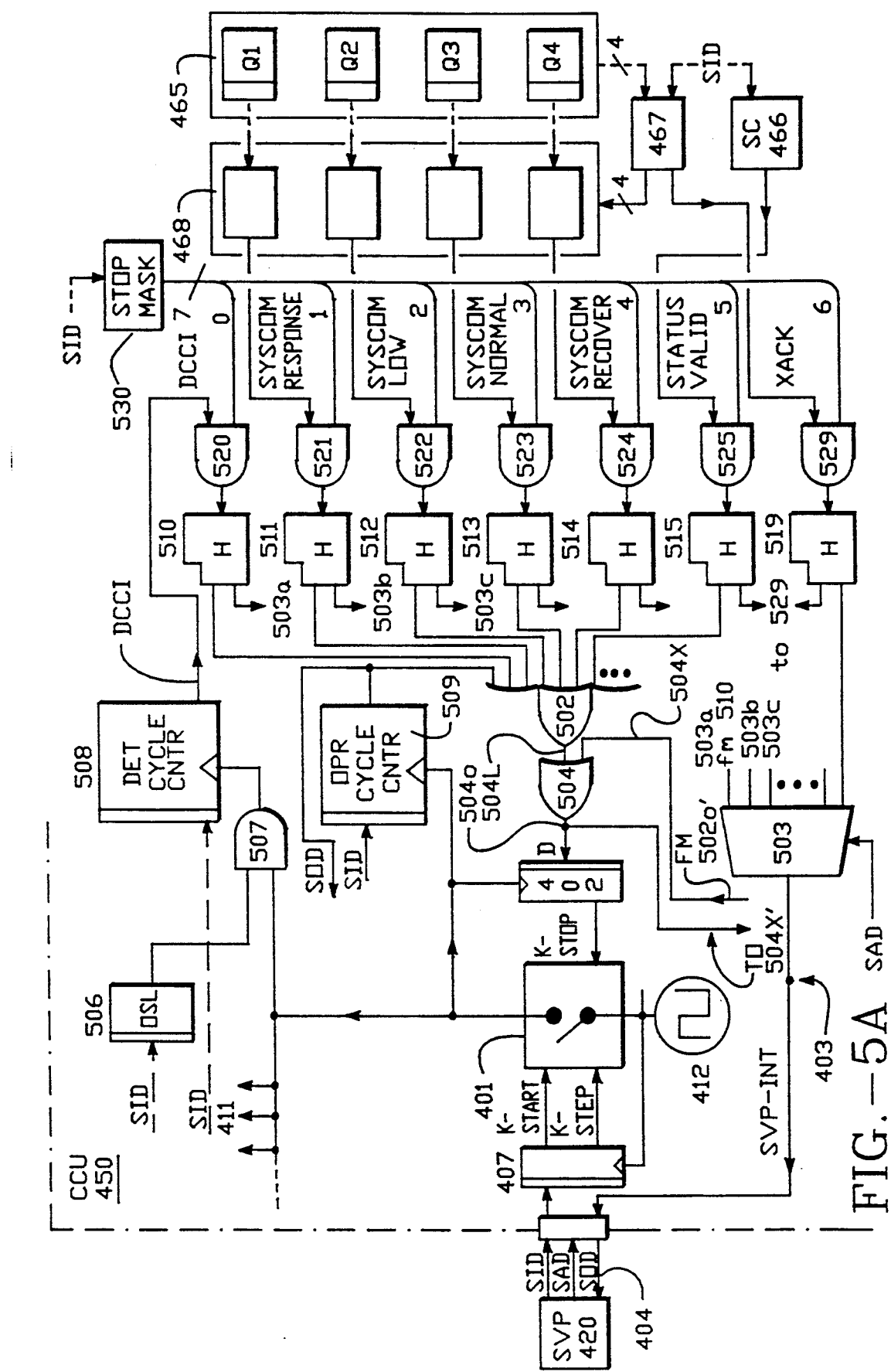
FIG. 5A shows a combined clock stopping and SVP interrupting mechanism within a CCU portion of the mainframe of FIG. 4A.

The PU's 451-454 access data in the memory unit 460 through configurable data paths defined in the CCU 450. (CCU 450 includes a programmable crossbar router referred to as the System Data Switch or SDS for short.) PU's 451-454 send messages to the SVP 420 by first queuing respective message packets in queues area 465. The CCU 450 includes a "SYSCOM state machine" (467, FIG. 5A) which is used to indicate to the SVP 420 that messages for the SVP 420 are queued up in area 465. The SVP periodically polls the outputs of an interrupts-generating unit 468 (FIG. 5A), which is controlled by state machine 467 (FIG. 5A). When the SVP detects an interrupt signal, it concludes that a message is waiting in a corresponding one of its mail boxes (in one of the queues of area 465), and it asks the CCU 450 to transfer that message to it.

FIG. 4A shows three interfaces positioned between the CCU 450 and the SVP 420. They are respectively referenced as the "SYSCOM state machine" interface 445, the "Storage access" interface 446 and the "Determinism Cycle Counter" (DCC) interface 447.

The SYSCOM state machine interface 445 is the means through which the SVP polls the SYSCOM interrupt generator 468 (FIG. 5A) to discover whether there is mail waiting for it. The storage access interface 446 is the means through which the SVP asks the CCU 450 to transfer queued messages from area 465 and the means by which such messages move to the SVP 420. The DCC interface 447 couples the SVP 420 to a later discussed Determinism Cycle Counter (508 of FIG. 5A).

FIG. 4A illustrates a "one sided" version of mainframe 410. A "two-sided" version can be formed by placing a bottom-side mirror-image of FIG. 4A against the bottom side 410b of box 410 such that bottom side 410b serves as the axis of symmetry. There is only one SVP 420 in the two-sided version, but it has two mainframe controller ports (MFC's) to service both the top and bottom "sides" of the two-sided version. Remote connection bus 459 couples the top side to the mirror image bottom side in the two-sided version.

Of importance, when a two-sided version is employed, only one of clock generators 412 and 412' (the unshown mirror image clock generator) is active. The side-to-side interconnect bus 459 carries clock pulses from the CCU in the side having the active clock generator (412 or 412') to the side having the inactive clock generator. Clock pulses are then distributed from the CCU (450 and 450', the latter not shown) of each side to the respective components of its side. Thus, both sides of a two-sided version operate off of a single clock generating source (412 or 412').

Of further importance, because the two sided version is larger than its one-sided counterpart, it takes more time to halt system clocks in a two-sided version than it does in a one-sided version. Shut-down delays are added by a cross-coupled clock-pinch circuit (not shown) which connects the two sides through bus 459 and gives either side of the two-sided version the ability to initiate a system-wide clock stoppage.

Ideally, it should be possible to maintain deterministic behavior irrespective of whether the system is one-sided or multi-sided. A circuit structure for doing this will be described later in conjunction with FIG. 5B.

Each of processor units (PU) 451-454 of FIG. 4A has a pipelined architecture which allows it to concurrently process a stream of overlapping micro-instructions. At any one time, each of PU's 451-454 can be executing parts of independent software routines or exchanging data belonging to interrelated software routines through the common memory unit 460.

At the same time, system support processes such as parity checking, logic correctness checking, address boundary checking, read/write protect and so forth execute within the mainframe 410 side by side with the execution of concurrently running software programs.

Each of the concurrent support processes and software programs can require interaction with the service processor 420 at any given time. For example, if a fault develops within the mainframe 410 and it is determined that the fault can be circumvented by altering certain data or reconfiguring certain data paths within the MF 410, a fault detecting part (not shown) of the MF 410 may ask the SVP for assistance in making such corrections.

Requests for SVP interaction can come singularly, spread over time or simultaneously from different requestors within the MF 410. Requests can also overlap in time such that a second request issues from one part of the MF as the SVP 420 is busy servicing a request earlier issued from another part of the MF 410.

The specific interaction requests which the mainframe might send to the SVP are too numerous to fully describe here. The below Table I is a nonexhaustive list of interrupt signals generated within the mainframe that may ask the SVP to perform certain functions that affect internal states of the MF 410 and, when the mainframe 410 is in the deterministic mode, the following signals also automatically turn off the mainframe system clocks.

TABLE I

: SYSCOM Response Queue Interrupt (Lowest priority)
: SYSCOM Low Priority Queue Interrupt
: SYSCOM Normal Queue Interrupt
: SYSCOM Recovery Queue Interrupt (Highest priority)
: SC Status Valid (SV)
: Transaction Acknowledge (XACK)
: Determinism Cycle Counter Interrupt (DCCI)

The first four "SYSCOM" interrupt signals are each repeatedly generated by the interrupt-signals generating means (468 of FIG. 5A) as long as a corresponding set of four latches within the SYSCOM state machine (467 of FIG. 5A) remain set. The latches are set in response to SYSCOM action requests initiated from within the MF 410.

In the nondeterministic mode, the SVP 420 continuously polls the outputs of the interrupt-signals generating means (468) to determine whether the MF requires responsive SVP actions. When the SVP 420 finishes servicing one of the four SYSCOM interrupts, the SVP sends a reset-request signal to the SYSCOM state machine 467 as part of a handshaking protocol. The SYSCOM state machine 467 resets the corresponding one of its internal SYSCOM interrupt generating latches and this shuts off a corresponding interrupt signal generator inside means 468. The state machine 467 then sends an XACK signal back to the SVP informing the SVP that it has reset the interrupt-generating latch, as requested.

The XACK (Transaction acknowledge) interrupt is therefore an interrupt sent from the MF 410 back to the SVP 420 informing the SVP of the fact that an SVP initiated action within the MF has completed.

The other two of the SV, XACK and DCCI interrupt triplet are also signals sent back from the MF to the SVP, typically informing the SVP that an SVP initiated action (or an operator initiated action) has completed within the MF. They merely cover different actions within the mainframe 410.

"SC" represents a System Controller portion of the CCU 450 which directs operations in the System Data Switch (SDS) and other parts of the mainframe. When the SVP 420 wants to fetch data out of the mainstore 460 or to alter data within the mainstore 460, the SVP sends a corresponding DISPLAYMEM or ALTMEM request by way of the storage interface 446 to the System Controller (SC).

When the request is obeyed, the SC (shown as box 466 in FIG. 5A) returns an active "SC Status Valid" (SV) signal back to the SVP to indicate to the SVP 420 that the CCU 450 has completed its servicing of the request. In the case of a DISPLAYMEM request, an active Sv interrupt tells the SVP 420 that the CCU 450 has valid data loaded in one of its internal buffers and that this data can now be read by the SVP 420. In the case of an ALTMEM request, the SV interrupt tells the SVP 420 that the CCU 450 has completed transferring a block of data into memory 460.

The Determinism Cycle Counter is another resource within the mainframe 410 which the SVP 420 uses from time to time. When the SVP turns the MF clocks on, it can at the same time ask the MF to turn the MF clocks off again, after a short burst of cycles (e.g. 100 cycles) complete. This is done by way of the Determinism Cycle Counter (DCC). The DCC (508 of FIG. 5A) will be described in more detail when FIG. 5A is discussed. For now it is sufficient to note that a Determinism Cycle Counter interrupt (DCCI) is sent back to the SVP after the DCC completes a time out and automatically shuts off the MF clocks The above-mentioned seven interrupt signals can be activated in either of the two basic operating modes: deterministic and nondeterministic. (The DCCI is useful only in the deterministic mode).

In the nondeterministic mode, the MF 410 is usually operating at its maximum speed and the SVP clocks are usually running much slower than the MF clocks.

Sometimes, a serial string of operations has to be performed by chaining tasks in both the SVP and the MF. SVP operations which precede MF operations in such a situation generally become bottlenecks to overall system performance by virtue of their slower speed. Accordingly, when an MF process must wait for completion of a specific SVP task under such conditions, it becomes imperative that the SVP complete its specific task as soon as possible, before servicing other tasks which are not causing a wait to occur in the MF 410. Otherwise, the MF will idle for excessive lengths of time while the SVP processes nonessential tasks before performing the bottlenecking task.

The above-mentioned four SYSCOM interrupts and the service requests which accompany them are accordingly assigned priorities depending on how urgent it is for the SVP to complete one task ahead of another.

In the nondeterministic mode, the SVP services SYSCOM interrupts which involve error "Recovery" as having the highest urgency (highest priority), and in so doing the SVP interrupts its servicing of any "Normal" priority SYSCOM requests or even less important "Low priority" SYSCOM interrupts or even much less urgent "Response" SYSCOM interrupts. Each higher level interrupt is allowed to interrupt the servicing of a lower level interrupt.

The MF 410 sends SYSCOM Recovery interrupts to the SVP 420 when the MF needs immediate assistance from the SVP 420 in correcting recoverable error conditions within the queues area 465 of central memory 460. Since the validity of all messages within the queues area 465 is suspect until corrected by the SVP, the SVP is programmed to give such "Recovery" interrupts the quickest response. They are considered top priority. SVP tasks of less urgency are respectively relegated to the Normal, Low and Response levels, the last level being for SVP actions of minimal urgency.

In the deterministic mode, the MF clocks can be running either at normal or single-step speed, but the SVP clocks appear to run at infinite speed to all MF operations because the MF puts itself into a system-wide sleep before requesting SVP intervention, and the SVP is always finished with its task by the time the MF is awakened out of its self-induced sleep. Accordingly, as a general rule, there is no requirement to maintain any specific priority among the Recovery, Normal and Low SYSCOM requests during the deterministic mode (an exception occurs when multiple requests are received simultaneously). The only requirement for maintaining deterministic behavior in the MF 410 is that these requests are serviced in the same manner one run after the next.

The SVP 420 services SYSCOM interrupts on a first come, first served basis during the deterministic mode. If a second SYSCOM interrupt is received after the SVP has begun servicing an earlier received SYSCOM interrupt, the SVP completes its servicing of the first received SYSCOM interrupt before proceeding to the next received SYSCOM interrupt.

Sometimes, when the CCU 450 asks the SVP to perform a certain task by way of a message stored in one of the SYSCOM queues, the SVP 420 has to turn around and ask the CCU 450 to perform a subtask which utilizes various resources within the MF 410 or alters data within the MF 410. The MF subtask assists the SVP in the completion of its main task. The SVP has to recapture its control of the MF once the subtask completes.

An example is where the SVP 420 is asked to transition one of the PU's from an operating state to a nonoperating (stopped) state by way of interface lines 441–444 (FIG. 4A). The SVP has to turn the MF clocks on for a short duration to carry out the requested transition. So the SVP sends a request to the DCCI mechanism (508, FIG. 5A) within the CCU 450 asking it to perform the subtask of turning clocks on for a short duration.

While main-system clocks are on for the short duration, other concurrent processes within the MF 410 can send new interrupts to the SVP. The SVP blocks out the new interrupts while it is in the midst of servicing a first interrupt. The new interrupts are not forever ignored, however, because the interrupt signals generating means 468 (FIG. 5A) within the MF repeats the new interrupts until they are ultimately acknowledged by the SVP. This will happen after the servicing of the first interrupt completes.

When the SVP 420 simultaneously receives two SYSCOM interrupts of different priority in the deterministic mode, the one with higher priority in the normal operating mode (the nondeterministic mode) is serviced first. This ordering is maintained mostly for the sake of consistency and not because there is a speed advantage in servicing one request ahead of another in the deterministic mode. Recovery interrupts get the highest priority because they can alter error-infected request messages that accompany lower level SYSCOM interrupts.

Generally, the SVP 420 will not receive more than one of the Status-valid, XACK or DCCI interrupts simultaneously because each normally arises from an SVP initiated action within the MF and the SVP should be initiating only one such MF action at a time. (A status-valid (SV) interrupt can also post when the SC completes service for an operator-initiated request. This will be detailed in conjunction with FIG. 6C.)

Examples of instances where the SVP 420 can receive multiple interrupts from the MF 410 will now be provided.

As a first example, assume that multiple software tasks, $MFT_1$, $MFT_2$, $MFT_3$, etc. are concurrently executing in the mainframe 410. A first of the mainframe tasks $MFT_1$, executing in a first processor unit (e.g. PU 451), may wish to freeze a second of the mainframe tasks, $MFT_2$, concurrently executing in a second processor unit (e.g. PU 452). This is done by way of a console STOP operation (see IBM Principles of Operation for System 390/ESA pp 12-4 and 4-2). Interaction with the SVP 420 is required for properly transitioning the second PU 452 from an "operating" state to a "stopped" state by way of control interface 442. So PU 451 submits a request to the CCU 450 and the CCU forwards the request for interaction to the SVP by way of posting a first SYSCOM interrupt request. (Assume the request is sent through the SYSCOM Normal priority queue [Q3 of FIG. 5A].)

To complicate matters, assume that at the same time, or a very short time later, third task $MFT_3$ in PU 453 decides that it wants to freeze operations in the first PU 451. It also submits its request via the CCU for interaction with the SVP. The CCU posts a second SYSCOM interrupt request corresponding to this task. (Assume this second request is sent by way of the SYSCOM Low priority queue [Q2 of FIG. 5A].)

One of the two posted SYSCOM requests eventually causes a clock stoppage in the mainframe. (A SYSCOM request asks the SVP to input what is potentially behavior-changing data into the MF. Such input should occur only at the earlier-described unique clock cycles.) Because it takes time to actually stop the MF clock 412, by the time mainframe clock pulses stop, both requests are posted in an interrupt-request storing area (in the internal latches of state machine 467). The SVP 420 has to decide which request should be serviced first.

Using the above, nondeterministic-mode prioritizing scheme, the SVP defines the higher priority SYSCOM interrupt as the first-to-arrive request and thus it becomes the first to be serviced by the SVP. The lower priority SYSCOM interrupt is deemed to have arrived later in time and it will not be serviced by the SVP until after the SVP completes its servicing of all higher priority SYSCOM interrupts (e.g., those posted by way of queues Q3 and Q4).

This methodology works to effectively prioritize overlapping requests, while preventing deadlock conditions and maintaining deterministic behavior in the mainframe 410. One SYSCOM request is processed at a time during deterministic mode while all other SYSCOM requests are ignored by the SVP. When the SVP finishes servicing what it considers the first received SYSCOM interrupt, it moves on to service the next SYSCOM interrupt which the SVP deems to be next queued up along an artificial time line. When all four SYSCOM queues, Q1, Q2, Q3 and Q4, are filled with requests (and no new requests come in), the SVP empties the Recovery queue Q4 first, then the Normal queue Q3, then the Low queue Q2, and last of all, the Response queue Q1.

SVP responses to the DCCI, XACK and Status-Valid interrupts are handled a little bit differently, depending on what process caused these interrupts to be posted in the first place. The SVP usually initiates the process which posts these latter three interrupts and thus the SVP inherently knows which process caused one of these interrupts to post. There is an exception already mentioned, but worth re-noting. Status-Valid interrupts can also post when the SC portion 466 of the CCU 450 completes an action initiated by the system operator. The SVP responds to such an SV interrupt by entering a special interlaced service submode during determinism mode. This will be discussed later in conjunction with FIG. 6C.

Before we proceed to FIG. 5A, a more detailed description of the service processor's (SVP 410) operations will be helpful in understanding how MF-to-SVP interactions take place.

The service processor (SVP) 420 connects to a large number of prespecified monitor points and a large number of scan latches (not shown) within the mainframe 410 by way of its mainframe control interface (MFC) and a scan bus 425 which couples the MFC to all circuits within the mainframe 410. The scan bus connections are primarily provided for isolating and debugging chip-level faults within the mainframe. But they also provide a highway by which any one part of the mainframe 410 can use the SVP as an intermediary for communicating with any other part of the mainframe 410.

The scan bus 425 carries scan address data (SAD) 43 for addressing each of the prespecified points or scan latches within the mainframe 410, scan input data (SID) 430 for setting or resetting desired ones of the scan latches within the mainframe 410, and scan output data (SOD) 404 representing the states of addressed ones of the monitor points within the mainframe 410.

The SVP 420 can observe the states of all monitor points within the mainframe at any time, irrespective of whether the mainframe clocks are running or not. This is done by addressing those points over the scan bus (using SAD 431) and collecting the returned scan output data, SOD 404. Generally speaking, the behavior of the mainframe 410 is not changed by the input of a scan address (SAD 431) from the SVP 420, into the MF 410, for the purpose of monitoring levels at a monitor point.

Certain of the scan latches (clocked scan latches) within the mainframe 410 can be determinatively controlled by the SVP only when the delivery of system clock pulses 411 to such scan latches is suppressed. Others of the mainframe scan latches (Operating State Latches or OSL's for short) are nonclocked and can be set or reset by the SVP 420 even while mainframe clocks are running. Details about the scan system may be found in the above cited U.S. Pat. application Ser. No. 07/670,289 entitled "SCANNABLE SYSTEM WITH ADDRESSABLE SCAN RESET GROUPS", by Robert Edwards et al, which is incorporated herein by reference.

Some of the clocked latches and nonclocked scan latches (OSL's) in the mainframe define service-latches processor-to-mainframe intercommunication buffers (referred to hereafter also as SVP-MF buffers). The SVP 420 can read out the contents of any one or more of these buffers while mainframe clocks are running without changing the timing of tasks that are concurrently executing in the mainframe.

A first subset of the SVP-MF latches define so-called PU start/stop registers which allow the SVP 420 to issue respective console start/stop commands 441–444 to individual ones of the processor units 451–454. The console start/stop commands 441–444 are used to transition each corresponding PU between "operating" and "stopped" states.

System clock pulses 411 are still supplied to the MF 410 when one of its PU's 451–454 transitions to a console-stop state. But, transitioning between the operating state and stop state requires orderly synchronization with other machine states. The SVP 420 interacts with the mainframe clock control (see FIG. 5A) to provide an orderly transition between the PU operating and stopped states.

One or more of the PU's 451–454 can continue to run in an "operating" state and send requests to the SVP 420 while one or more of the other PU's 451–454 is stopped. The console start/stop states (brought about through control interfaces 441–444) are to be distinguished from clock stop/start commands (K-STOP and K-START in FIG. 5A) which turn all main system clock pulses (411) off so that the entire mainframe 410 is frozen in a particular state.

A second subset of the SVP-MF latches define so-called SYSCOM buffers which are used to transfer messages between the SVP 420 and the SYSCOM queues area 465 of the central memory 460. These latches allow immediate message exchanges to take place between the SVP 420 and the CCU 450 while the mainframe 410 continues to receive system clock pulses 411. One example of a SYSCOM buffer exchange is where the CCU 450 sends a request to the SVP 420 asking for assistance in sending a console stop command 441–444 to a particular one or more of the PU's 451–454.

SYSCOM messages can shuttle from the CCU 450 to the SVP 420 or vice versa. A copy of these messages is maintained in queues area 465. A data-valid handshake mechanism is used in each message transfer.

During SYSCOM transfers in which the SVP 420 sends messages to the CCU 450, the SVP sets one of a first set of data-valid OSL's (found inside box 467) to indicate to the CCU 450 that the SVP has loaded a message for the CCU into a particular SYSCOM buffer within area 465 (in a part of 465 other than the illustrated queues, Q1–Q4). When the deterministic-mode is in effect, this should only happen when the mainframe 410 is in a selfinduced sleep state.

The CCU 450 continuously polls the first set of data-valid OSL's (located within state machine 467) while the mainframe clocks 412 are running and responds in accordance with a prioritized interrupt servicing scheme by reading a message out of the indicated SYSCOM buffer (inside storage area 465) when the corresponding data-valid OSL is set by the SVP 420 and message reading resources become available within the CCU 450 for carrying out such a transfer. The CCU 450 resets the OSL in the first set of data valid latches (within 467) and sends a transaction acknowledge (XACK) message back to the SVP when the transfer is completed.

When messages move the other way, from the MF 410 to the SVP 420, the MF sets one of a second set of datavalid latches (clocked ones) to indicate to the SVP 420 that the CCU 450 has loaded a message for the SVP into a particular buffer. This step, of itself, does not affect the determinism of operations within the MF 410.

Among the second set of data-valid latches are four clocked latches which store the earlier mentioned four SYSCOM interrupt flags (Recovery, Normal, Low and Response). The SVP 420 responds to the activation of these interrupts in accordance with the above-described interrupt-prioritizing scheme.

When the SVP 420 services one of the four SYSCOM interrupts it uses yet others of the SVP-MF latches (OSL's) as a storage access interface (446 in FIG. 4A). The SVP 420 uses these latches to indicate to the CCU 450 that the SVP wishes to obtain data (DISPLAY_MEM) or alter data (ALT_MEM) stored in the queues area 465 of central memory unit 460. The SVP can use the storage interface 446 to ask the CCU to send it any block of data from the central memory unit 460 or it can ask the CCU to make specific changes to data stored in any area of memory unit 460. The CCU 450 sends a Status-Valid (SV) message back to the SVP when the requested transfer completes.

Upon emptying the message buffer, the SVP 420 then sends a handshake message back to the state machine (467 FIG. 5A) in the CCU 450 telling it to shut off the corresponding SYSCOM interrupt. (Header information within each queue tells the SVP how many messages are lined up in the queue. The SVP tells the CCU to shut off the corresponding SYSCOM interrupt only if no other messages are lined up in the queue.) The CCU 450 sends a transaction-acknowledge (XACK) back to the SVP upon doing so. If after the handshake, a new message for the SVP enters queues area 465, the CCU 450 turns the corresponding SYSCOM interrupt latch back on and interrupts-generating means 468 begins to repeatedly send new interrupt requests to the SVP until the SVP recognizes the new interrupt, services it and once again asks the CCU 450 to turn off the SYSCOM interrupt generating latch.

FIG. 4B illustrates a typical exchange between the SVP 420 and the mainframe 410. The SVP first uses scan bus 425 to address the scan latches of the SVP-MF communication buffers into which it intends to load data. (This can occur while MF clocks are still on.) Operation codes (OP codes) are then loaded into those buffers, also by way of the scan bus 425. (This can also occur while MF clocks are still on.) When the opcode loading is complete, the SVP sets the corresponding data-valid latch and thereby indicates to the MF 410 that the MF should read the message in the buffer. (In deterministic mode, this should happen only while MF 410 is in a self-induced sleep state.) The mainframe 410 acknowledges it has received the op-codes and, where necessary, executed the corresponding SVP request or command by returning either a "Status Valid" (SV) or a "transaction complete" message (XACK) to the SVP.

For some types of SVP requests, the MF 410 will have loaded a buffer with reply data before sending the command complete message (Status-Valid). The SVP will read this reply data out of the buffer after it detects the command complete signal.

The SV interrupt shuts the MF system clock off and leaves the mainframe in a sleep state. To expedite operations, the SVP 420 can turn the MF clocks back on first and then proceed to read the valid data afterwards without affecting mainframe determinism. Scanning data out of a set of OSL's does not affect mainframe behavior.

The SVP 420 may interact with the mainframe 410 in many ways other than cooperating with the MF to maintain deterministic behavior in the MF. The SVP-MF interactions include: testing mainframe subcomponents, reconfiguring mainframe circuit paths to circumvent failed subcomponents and sending system console messages to the mainframe.

One use of the SVP 420 is to act as a fault monitoring means during system bring-up (during the debugging of new system hardware and/or software). A same process is repeated many times in the mainframe 410 (as earlier mentioned) while the SVP uses the scan bus 425 to monitor the states of various monitor points within the mainframe and to thereby detect faults.

The determinism maintaining method of FIG. 3 is used in the SVP/MF structure 400 to assure that the SVP 420 does not send signals into the MF 410 which might alter operations within any specific part of the mainframe 410 at arbitrary time points during system bring-up.

Referring briefly back to FIG. 3, when the mainframe is running at full speed the repeat period $t_2-t_1$ is approximately 7 nS in structure 400 while the duration $(t_r-t_N)$ of the special clock cycle "N+1" is at least 100 nS (two cycles of the SVP) and more typically it is on the order of one microsecond (1 uS) or more because it takes the SVP tens or hundreds of cycles to respond to a clock stop event. When the mainframe is being single-stepped, duration $t_2-t_1$ can be much greater than 7 nS and clock cycles 1 to N are not necessarily periodic.

As already explained, the SVP/MF structure 400 of FIG. 4A faces one problem not seen in FIG. 1. The problem is that plural tasks (e.g., $MFT_1$, $MFT_2$, $MFT_3$, etc.) executing in one or more of mainframe units 450, 451-454 or 460 can each independently request a clock-stoppage at a given time. The SVP 420 has to decide at the "load data" time $t_D$ of FIG. 3 what data (request or command) is to be loaded and where to load it. Since there is the possibility that more than one subunit of the mainframe 410 has simultaneously initiated a clock stoppage, the SVP has to make sure it prioritizes its responses to multiple requests the same way in every run and it has to avoid deadlock conditions.

Referring to FIG. 5A, the SVP 420 controls a clock-stoppage masking means within the CCU 450 (elements 520 to 530, which will be described shortly) and uses this means for prioritizing and managing its (the SVP's) own responses to clock-stopping events within the mainframe 410.

As shown in FIG. 5A, a clock stop/start controller 401 is provided within CCU 450 for controlling mainframe clock stoppage, restart and single stepping. Nongated main system clock pulses (K) 412 enter the clock controller 401 at one side and appropriately delayed versions of the system clock pulses 411 (referred to as gated clock signals or "GK" for short) are distributed to spaced-apart components of the mainframe through the other side. Since it takes finite time even at the speed of light for clock signals to travel from the central clock generator 412 to different parts of a large mainframe, the distributed clock signals 411 have to be of skewed phases to compensate for travel time. When a clock stop command issues, it also takes finite time to halt all these skewed clock signals 411.

Controller 401 receives clock-stop commands (K-STOP) from a first register 402 and clock-start (K-START) and clock-single-step (K-STEP) commands from a second register 407. The K-START/STEP register 407 is set and reset by scan input data (SID) 430 supplied from the SVP 420. A D-input terminal of the K-STOP register 402 is driven by the output 504o of a remote/local stop-requests collecting OR gate 504.

One input terminal 504L of OR gate 504 receives the output of a local stop-requests collecting OR gate 502 and another input terminal 504X of gate 504 receives the output 502o' of a counterpart to gate 502' (not shown) which is located in the remote or "second side" (not shown) of MF 410. The output of OR gate 504 similarly couples to the remote input terminal 504X' of its counterpart (504', not shown) in the second side of the mainframe 410.

A logic one ("1") may be applied to either input terminal, 504L or 504X, of remote/local gate 504 to set the clock stopping register 402.

Figure 5B:
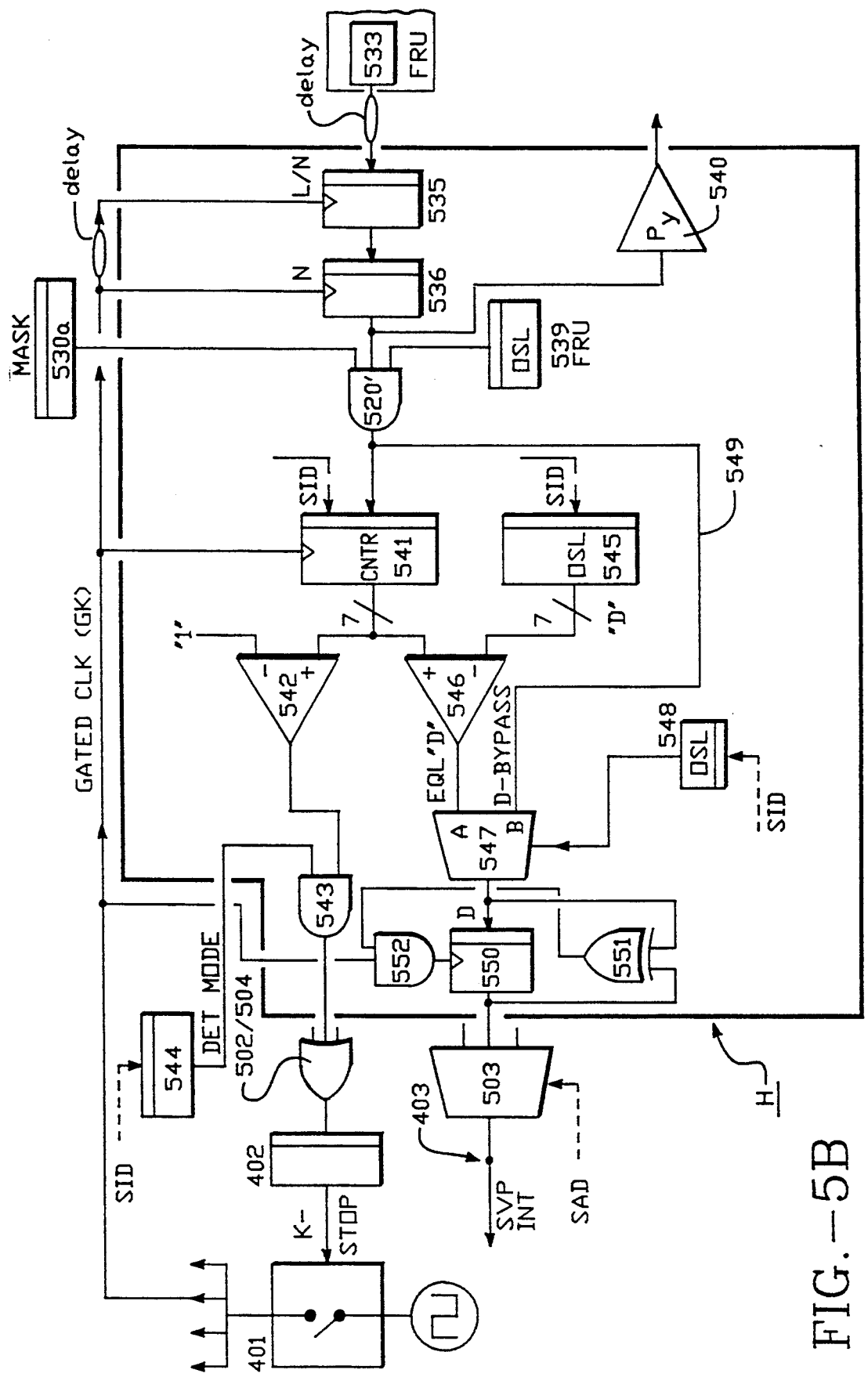
FIG. 5B is a schematic of an interrupt handler (Hbox) found in FIG. 5A.

Referring momentarily to FIG. 5B, each of "H-boxes" 510 through 519 includes a counter register 541 which is responsible for applying a logic one to the D-input of register 402 by way of OR gates 502 and 504. Each such counter register 541 may be reset by way of the scan input data (SID) path 430. When the GK signals 411 are restarted by a K-START command, stoppage latch 402 will remain reset until one of counter registers 54 reaches a predetermined value (e.g., "1") and forwards a logic true by way of comparator 542 (FIG. 5B), AND gate 543 and OR gates 502,504 to register 402. SVP-interrupting latch 550 is typically reset by way of the SID pathway 430 at the same time that counter 541 and register 402 are reset. This mechanism will be described in more detail shortly.

Register 402 (FIG. 5A) is clocked from the GK side of control box 401. Register 407 is clocked directly from clock generator 412.

OR gate 502 collects stop request signals sent to it from a plurality of stop requesting sources. The stop requesting sources include: (a) a determinism cycle counter (DCC) 508, (b) a Response-priority SYSCOM interrupt generator inside of box 468, (c) a Low-priority SYSCOM interrupt generator also inside of box 468, (d) a Normal-priority SYSCOM interrupt generator inside of box 468, (e) a High-priority "error recovery" SYSCOM interrupt generator inside of box 468, (f) a "status valid" (SV) indicating signal which is output from SC 466, and (g) a transaction-acknowledge (XACK) output of box 467. OR gate 502 can additionally receive clock-stop requests from other sources, which are not shown in FIG. 5A.

The dashed arrows connecting storage area 465 to the four SYSCOM requestor generators in box 468 and to the four SYSCOM latches in box 467 are logical rather than physical. A software program executed by one or more of the PU's keeps track of the messages loaded into the queue areas Q1-Q4 of storage area 465. When a new message is entered into an empty queue area, the software program turns on the corresponding interrupt-requesting latch in box 467. The corresponding interrupt-requesting generator in box 468 then begins to send interrupt pulses to its corresponding SYS- COM masking gate (521-524). The interrupt requests get through when the masking gate (521-524) is unmasked by mask control register 530 and posted into a request counter (541) within the corresponding one of H boxes 511-514 (see also FIG. 5B). The first posted stop-request then moves from its corresponding H-box through gates 502 and 504 to the D-input of latch 402.

Request-masking AND gates 520-529 are respectively interposed between output terminals of request-generating devices (e.g., 508, 466, 467 and 468) inside mainframe 410 and the corresponding input terminals of request handling H-boxes 510-519. Each request-masking gate 520-529 may be used to independently pass or block a corresponding request signal from entering its respective H-box 510-519. In FIG. 5A the AND gates 520-529 are shown to be outside their respective H-boxes in order to simplify this explanation. Actually, they are located inside their respective H-boxes, as better shown in FIG. 5B. The details of FIG. 5B will be explained shortly.

A DCCI signal from the determinism cycle counter (DCC) constitutes one of the clock-stop requesting signals. This signal is passed or blocked by masking gate 520. If the DCCI signal passes through masking gate 520, it posts itself inside corresponding H-box 510. The DCCI signal is blocked from passing through gate 520 when that gate 520 is placed in a masking mode by mask-control register 530.

Mask-control register 530 is composed of operating state latches (OSL's, individually referenced as 530a, 530b, etc., see FIG. 5B). These OSL's, 530a, 530b, etc., may be individually set or reset by scan input data (SID) 430 supplied from the SVP 420. The pattern of ones and zeroes loaded into register 530 controls the request masking/unmasking functions of AND gates 520-529. Any combination of gates 520-529 can be masked unmasked at a time.

The determinism cycle counter (DCC) 508 is a 32-bit counter which is used when the SVP 420 wishes to run the mainframe through a predetermined, relatively-small number (e.g. less than $2^{32}$) of clock pulses 411 after a first clock-stop state is achieved and to automatically stop the mainframe 410 in a second clock-stop state by halting the gated clock pulses (GK) 411 after a relatively-small number of GK pulses (e.g. 10-100 pulses) have issued. The maximum count time for DCC 508 is approximately one second when the period of system clock 412 is 7 ns. (The actual number of issued clock pulses might be slightly more than the number requested by DCC 508, but it is guaranteed to be at least the requested number.)

OCC 509 has 64 bits giving it as much as a full day's worth of count capacity. The system operator uses the OCC 509 to halt the machine 410 as far out as $2^{64}$ cycles after a previous halt.

The advantage of using the DCC 508 to run the mainframe through a predetermined burst of clock pulses 11 is multi-fold.

Firstly all processes within the mainframe 410 can use the scan bus 425 as a highway for relaying messages to the SVP 420 asking the SVP 420 to get the DCC 508 to a desired count. The DCC 508 is thus a central resource which is accessible to all peripheral parts of the MF 410 irrespective of the size to which the MF is scaled (e.g., 2PU's, 4 PU's, 8PU's). Also, by centralizing the DCC mechanism in the CCU 450, software design is greatly simplified. Whenever clocks stop in the MF 410, the SVP 420 needs to poll only the H-boxes 510-519 to determine what process caused the clock stoppage. It does not have to scan through all parts of an ever-expandable mainframe looking for the cause of a clock stoppage.

A second advantage has to do with occasional desires to run the mainframe 410 at different operating speeds. (Clock generator 412 is a variable frequency type.) When the gated clock pulses 411 issue at the maximum frequency of generator 412, the mainframe completes whatever task is assigned to it during the burst in minimum time. If there is a speed-related fault within the mainframe, it can be most easily uncovered by using the burst mode at a slower speed as opposed to the single-stepping mode. (The frequency of generator 412 can be varied as needed.) The H-boxes 510-519 have a frequency independent design which allows all SVP to MF transactions (including DCCI, XACK, SV) to occur while the MF operates at one arbitrary frequency and the SVP at another.

OSL 506 and gate 507 allow the SVP 420 to halt clocks to DCC 508 at any time and to preload it with a desired burst-duration value, including times when the gated MF clocks 411 are still running if so desired. (This would violate the basic rule set forth in FIG. 1 for blocking all inputs into the MF from a second system, but in this case it is certain that resetting OSL 506 and loading DCC 508, of itself, will not alter behavior within the MF 410. So it is permissible to load DCC 508 while MF clocks are running.) The SVP 420 loads a desired count into cycle counter 508 by way of the SID pathway.

When the DCC 508 causes a clock stoppage in the mainframe 410, it is assumed that the gated clocks (GK) have previously stopped at least once before for one reason or another and a software program within the SVP 420 wanted to reactivate the gated clocks (GK) for a short burst having at least a predefined minimum number of pulses (e.g. 10-100 pulses). The SVP 420 would have preloaded the DCC 508 with a count value and issued a K-START command to controller 401. Cycle counter 508 then counts down the desired number of cycles and issues a stop-request to collecting OR gate 502 by way of H-box 510.

As this operation takes place, the mask-controlling register 530 should be preloaded with an appropriate bit pattern to allow signals to flow through masking-AND gate 520 to H-box 510. Mask-control register 530 can be loaded so that it lets only the count equals zero signal (DCCI) from counter 508 through AND gate 520 while blocking similar signals from flowing through other gates 521-529, or, it might allow other interrupts through as well.

When the DCC 508 reaches the zero count, it issues the DCCI signal to its corresponding H-box, 510, and H-box 510 then sends an interrupt request to SVP 420 by way of a service-request polling multiplexer 503. (Multiplexer 503 represents a set of AND gates each activated by a unique scan address.)

The SVP 420 periodically polls the inputs of multiplexer 503 using the scan address signals (SAD) as selectors and it scans out the state of multiplexer output 403 through SOD line 404.

Once the desired minimum number of clock pulses have been generated and the DCC 508 has counted them down and a clock-stop request has issued to clock control 401, the gated clocks (GK) will come to a halt. The SVP 420 is then free to load a new masking pattern into the stop-mask register 530. The new pattern might, by way of example, selectively mask out further clock-stopping signals from H box 510 and unmask (enable) one or more of the other AND gates 521-529, thereby allowing stop-request signals other than from the DCC 508 to propagate to the stop-request collecting OR gate 502.

The internal structure of H-box 510 (interrupt handler) is shown in FIG. 5B as exemplary of the other H-boxes 511-519. (H-boxes 511-519 have the same structure as box 510.) Masking gate 520 is now shown inside H-box 510. (It was shown outside the H-box in FIG. 5A to simplify explanations.) The corresponding portion of stop-mask register 530 is shown as OSL latch 530a. OSL 539 is a device-selecting latch used for activating different combinations of Field Replaceable Units (FRU's). All H-boxes 510-519 are located inside one FRU, but each can be coupled to receive an interrupt from a source 533 located in a FRU which may have to be taken off line for one reason or another. OSL 539 is controlled by a software module separate from that operating mask register 530. This simplifies software design. When a FRU containing source 533 is removed or deactivated, OSL 539 is reset by the separate software module. When OSL 539 is reset, interrupt signals are blocked from passing through masking gate 520.

Forgetting that H-box 510 is specifically connected to the DCC 508, let it be assumed that H-box of FIG. 5A represents any of H-boxes 510-519 and that gated clocks (GK) are initially running. An interrupt posting signal 533, as issued from a corresponding MF task, arrives at the right side of the H-box 510. The received signal 533 passes through synchronizing latches 535 and 536, through interrupt-masking AND gate 520 to start up a 7-bit counter 541. Counter 541 is clocked by one of the still-running gated system clock signals (GK) 411. Synchronizing latch 535 receives a "late or normal" (L/N) version of the gated system clock signal (GK) while latch 536 receives a "normal" (N), nondelayed version. The synchronizing latches 535 and 536 are so clocked by delayed and nondelayed version of the clock signal to counteract the delay effects of interrupts posting from sources 533 located different distances (and thus potentially a different analog length of delay) away from the H-box. Interrupts have to arrive within predefined time windows if synchronism and deterministic behavior is to be maintained. The delay between the N and L/N clocks can be set to an appropriate value (including approximately zero), as necessary.

A parity checking circuit (Py) 540 is also provided in H-box 510, coupling the output from the second synchronizing latch 536 back to an error-history tree (not shown). This Py circuit 540 is used for verifying the integrity of signals sent to the H-box over communicating circuits (not shown) distributed throughout the mainframe 410. When the transmitted signal finally shifts through synchronizing latches 535 and 536, it should generate a predefined parity condition in the Py checker 540. If not, an error indication is sent out to the error history tree (not shown).

With the clocks (GK) still running and counter 541 having been started by the received interrupt-posting signal 533, the count in unit 541 will eventually pass a predefined first value, (e.g. "1"). A first comparator 542 in the H-box is coupled to detect this value crossing and to forward a logic true to the stop-request collecting OR gate 502 (already mentioned) by way of masking gate 543.

An OSL 544 is preloaded with a logic "1" during the deterministic mode to let the signal through gate 543 to the stop-collecting OR gate 502; thereby posting a stop-clock command in register 402. In the nondeterministic mode, OSL 544 is reset. SYSCOM and other interrupt requests can still get through the H-box to the SVP in the nondeterministic mode but they no longer stop the mainframe clocks (GK) automatically.

Counter 541 continues to count even after comparator 542 outputs a logic "1". This is so because clock stoppage does not occur instantly.

The number of clock cycles which transpire between the time latch 402 issues a K-stop command and actual stoppage is usually known but varies depending on the configuration of the mainframe. It is typically in the range 11 to 16 cycles depending on whether the mainframe is one-sided or two-sided, but this number can vary outside the range.

A predetermined delay value D is loaded into a 7-bit OSL register 545 to correspond to the actual clock-stop response time of the system. When counter 541 reaches the value in register 545, a second comparator 546 sends a delayed logic true signal ("1") through multiplexer 547 and through a de-glitching circuit, composed of clocked latch 550 and exclusive-OR (XOR) gate 551 (described immediately below), to the SVP interrupt collecting multiplexer 503.

OSL 548 selects either the A or B input of multiplexer 547 as the output of that multiplexer 547. In the deterministic mode, OSL 548 should be set to choose input A of multiplexer 547. In the nondeterministic mode OSL 548 can be set by way of scan input data (SID) so as to bypass the programmable delay function provided by the D delay register 545 and to allow the posting signal 533 to flow directly from the output of masking gate 520 through bypass line 549 and through the B input of multiplexer 547 to the de-glitch circuit 550, 551 and from there to multiplexer 503.

In some embodiments, the delay-bypass control OSL 548 is eliminated from each of the H-boxes and the output of the deterministic mode control latch 544 controls the input selection function of multiplexer 547. When the deterministic mode (DET MODE) is active, the variable delay path is selected by multiplexer 547 (input A) for all H-boxes. When the deterministic mode is not active, the B input of multiplexer 547 is selected. One latch, 544, thus serves the dual function of enabling clock stop commands to pass through AND gate 543 and enabling corresponding (delayed) SVP interrupts to pass through multiplexer 547 in all H-boxes when the deterministic mode is active.

As already mentioned, the output of multiplexer 547 passes through a de-glitching circuit composed of clocked latch 550 and exclusive-OR (XOR) gate 551. The de-glitching circuit transfers a glitch free version of the signal present at the output of multiplexer 547 to the input of the SVP-scanned multiplexer 503. One input of XOR gate 551 receives the signal at the D-input of latch 550 and a second input of XOR gate 551 receives the signal at the Q-output of latch 550. The output of XOR gate 551 drives one input of clock-passing AND gate 552. The other input of AND gate 552 receives gated clock pulses (GK). The output of AND gate 552 drives the clock input of latch 550. Latch 550 is able to switch states only when a gated clock edge is received and the Q and D levels of latch 550 are already at different levels as the clock edge arrives. If the D input level of latch 550 is not pre-set to be different from the Q output before the clock edge arrives, a logic "0" is applied to the clock-input terminal of latch 550 as the clock edge arrives and latch 550 is thereby suppressed from responding to any transitory spike at its D input which is time-aligned with the system clock edge, or more importantly, itself outputting spikes that are time aligned with the GK edges even when its D-input is low (at logic "0"). Signals to multiplexer 503 are thus kept free of undesired spikes which are timealigned with mainframe clock transitions.

The reason why the de glitch circuit 550, 551 is included in each H-box is because the SVP 420 polls multiplexer 503 asynchronously with respect to the mainframe system clock (K). If a logic-high glitch happens to appear on an input of multiplexer 503 just as the SVP 420 is polling that line, the SVP may incorrectly interpret the glitch as an interrupt request. Every input to multiplexer 503 should therefore be kept free of such signal glitches.

It is not uncommon for spikes to develop in outputs within the mainframe as the system clock (K) undergoes transitions. This is particularly true for the output of latch 550. Even when the D-input of latch 550 remains unchanged, the output of latch 550 can exhibit a spike when latch 550 receives a leading or trailing edge of a gated clock pulse (GK) from the system clock. AND gate 552 blocks clock pulses from reaching latch 552 unless the D-input of latch 552 is different from its Q-output. The output of latch 550 is thus kept free of undesired glitches.

There are several advantages to including a programmable delay means such as that formed by OSL 545, counter 541, and comparator 546 in each interrupt handler (H-box) 510–519:

(1) First, the delay count in OSL 545 can be adjusted to make sure the SVP interrupt line 403 goes high only after the last mainframe clock pulse (e.g. the pulse of cycle N in FIG. 3) issues as clock stoppage occurs. This should occur irrespective of the speeds at which the mainframe and SVP are operating at. It should be recalled that the SVP 420 can much faster than the mainframe 410 if MF 410 is being single stepped during a deterministic debugging run. In such a case, if the SVP interrupt line 403 goes high before the last mainframe clock pulse has issued, there is the danger that the SVP 420 will alter states within the MF 410 before the last MF clock pulse issues and determinism will be compromised.

(2) A second benefit of having variable delay is that it takes longer to halt MF clocks in the dual-sided version of the mainframe than in the single sided version. With programmable delay, it is possible to use the same H-box design for both versions.

With the delay OSL 545 appropriately programmed, the clock controller 401 should always halt the mainframe system clocks before the SVP 420 receives and begins to respond to the SVP interrupt signal supplied from multiplexer 503.

When the SVP 420 recognizes a posted interrupt signal 403 (as it polls multiplexer 503), the SVP automatically knows from the SAD applied to multiplexer 503 which of handlers 510 to 519 posted the interrupt. After MF clocks shut off, the SVP will re-poll all the inputs of multiplexer 503 before deciding to respond to any one particular interrupt. This is done so that, in situations where two H-boxes simultaneously post SVP interrupts, the SVP will be aware that such simultaneous postings have occurred. If more than one request for SVP servicing is found to be posted, the SVP selects the highest priority one.

After selecting one request as the one to be first serviced, the SVP reads (scans out) a message prestored by the MF 410 in corresponding message buffer of the selected request. The SVP clears registers 535, 536, 541 and 550 in the H-boxes 510–519 where it finds that counter (register) 541 has reached the "D" value of it corresponding OSL 545. The SVP 420 then loads mask control register 530 with an appropriate masking pattern which blocks the nonselected requests and while allowing the SVP to utilize MF resources such as the DCC 508, when needed, for servicing the selected request.

In some instances, the SVP 420 has to turn the MF system clock signals 411 back on for a short period in order to obtain assistance from MF resources in performing a task requested by the MF 410.

FIG. 6A shows a first such situation. In first time range 601, while MF clocks are on, a first mainframe process MFP$_1$ formulates a message 621 in one of the mainframe SYSCOM buffers asking the SVP 420 to next send a memory alteration or memory dump command to the MF 410, for example. The first mainframe process MFP$_1$ posts a SYSCOM interrupt (i.e., via H-box 511) just before time point 602. At time point 602, the mainframe clocks (represented by a string of X's) stop in response to the posted SYSCOM interrupt.

The SVP 420 receives the corresponding interrupt on line 403 only after the last MF gated clock pulse has issued. The received interrupt signal 403 indicates to the SVP that a valid request is awaiting in one of the SVP-MF buffers.

In time range 603, the MF clocks are off as indicated by a line without X's. The SVP 420 polls multiplexer 503 (FIG. 5B) during this time span 603. It determines that the interrupt came through H-box 512 and it reads the request message out of the corresponding SYSCOM buffer. In servicing message 621, which it received from the mainframe, the SVP next formulates an ALTER MEM message 623 and loads this message 623 back into the MF 410 (while MF clocks are off) for the CCU 450 to discover and respond to when the MF next reawakens. The SVP also masks out all interrupts except the status valid (SV) interrupt (H-box 515), the XACK interrupt (H-box 519) and the DCCI (H-box 510) during time span 603 using masking register 530.

A K-START signal is then issued from the SVP through register 407 to controller 401 thereby restarting the system clocks at time point 604.

In time span 605, the CCU 450 responds to the ALT-MEM request and issues an acknowledging Status-valid (SV) interrupt 625 (through H-box 515) at time point 606 when the ALTMEM operation is complete. This acknowledgement 625 automatically causes the MF clocks to stop because OSL 544 (FIG. 5B) is set while the system is in the deterministic mode and a stop-clock signal correspondingly flows through AND gate 543.

In time span 607 (FIG. 6A), the MF clocks are again indicated to be turned off. During time span 607, the SVP reads out any status message which may have been generated by the CCU during preceding time span 605. The SVP formulates a handshaking message 627 ("Done") and loads it back into the MF to tell mainframe process MFP$_1$ that the task requested by the initiating message 621 is now complete. The SVP then unmasks all the interrupt AND gates 521–529 (FIG. 5A) and restarts the clocks at time 608 (FIG. 6A).

The mainframe 410 next reawakens at time point 608 and proceeds to execute more of its internal tasks in a wholly deterministic manner in following time span 609.

FIG. 6B shows a similar interaction with a few new twists. Mainframe clocks are on during time span 611 and a first mainframe process (MFP$_1$) formulates a first message 631 for the SVP ("DO A") requesting, for example, stoppage of a particular processor unit (e.g., PU 451). Unknown to MFP$_1$, a second process MFP$_2$, is simultaneously formulating a second message 632 for the SVP ("DO B"). MFP$_1$ issues a SYSCOM interrupt first and this stops the MF gated clocks 411 at time point 612.

The SVP reads message 631 and begins to respond during time range 613. As part of its response to message 631, the SVP needs to reawaken the mainframe for a brief period (e.g. no more than 100 cycles). The SVP loads the determinism cycle counter (DCC) 508 with a burst count (e.g. 100 cycles) thereby giving the mainframe enough time to execute a subtask which the SVP will ask a resource within the mainframe to perform (e.g. a processor STOP command). This is represented as transaction 633 (SVP →DCC) in FIG. 6B. The SVP masks gates 521-524 while leaving gates 520, 515 and 519 unmasked.

At time point 614, the SVP restarts the mainframe clocks. MF clocks are on during time span 615.

At a soon-following time point 615a, the second mainframe process (MFP$_2$) which had been formulating its own message 632 ("DO B") for the SVP, tries to post its interrupt request for SVP service. Since gates 521-524 are masked, the interrupt is blocked.

At slightly-later time point 615b (e.g. approximately 50 cycles into time span 615), the targeted PU which MFP$_1$ wanted to stop, completes its transition to the STOP state (635 denotes "state achieved"). This however, does not generate an interrupt. The number of cycles necessary for transitioning a PU from the "operating" state to the "stopped" state can vary (e.g. over a range of say 20–80 cycles) from one environment to the next (e.g., one-sided versus two-sided mainframes). It is preferable to give the mainframe slightly more time (e.g. 100 cycles) to complete the transition although it may consume less (e.g. 20 to 80 cycles). This way the SVP is sure that the PU has transitioned to the STOP state by time point 616, when the DCC zero count 636 initiates the next clocks-off state 617.

During time span 617, the SVP unmasks gates 521-524, turns the MF clocks back on at time point 618, and the SYSCOM from the second process, MFP$_2$, floods into one of the H-boxes as clocks resume during time span 619. The SVP then polls the interrupt handlers by way of multiplexer 503 (FIG. 5A) and recognizes the MFP$_2$ request that had been waiting around since time point 615a. The SVP then reads the corresponding message 632 ("DO B") from the corresponding SYSCOM buffer, blocks out other SYSCOM interrupts, and proceeds to service the request of message 632.

Figure 6C:
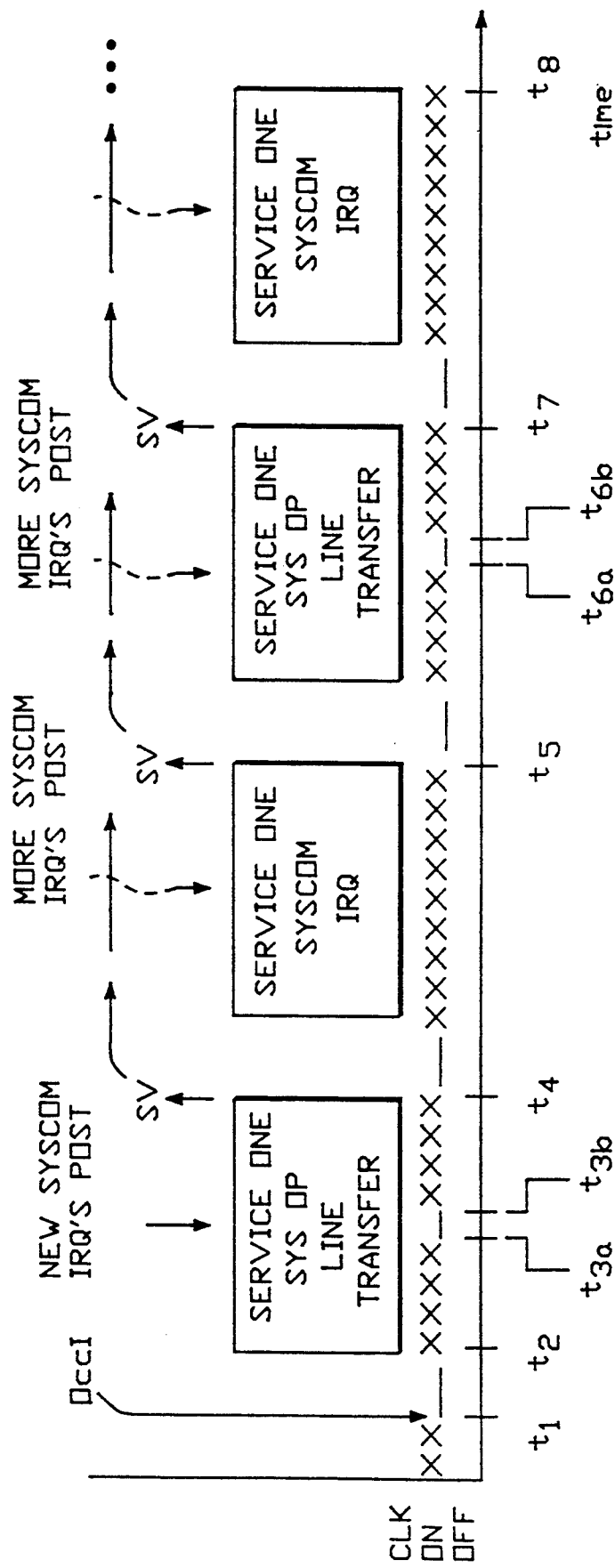
FIG. 6C graphs a deterministic run which interlaces the servicing of an operator-initiated file transfer with SVP services to MF-initiated interrupts.

Referring to FIG. 6C, recall that the system operator has to preload the Operator's Cycle Counter (OCC) 509 if he/she intends to interact with the MF 410 by, for example, sending blocks of file data into the MF 410 during determinism mode. The OCC 509 issues an interrupt (OCCI) at a predetermined cycle count and halts the main frame clocks. Say this happens at time $t_1$. The system operator then uses the SVP 420 to load a "line" of data (a block of data) into one of the SDS buffers. The SVP reconfigures the CCU 450 by asking it to transfer that data line to the central memory 460. The SVP then turns the MF system clock back on, at say time $t_2$. Before clocks come back on, however, the SVP sets up mask register 530 to block out all interrupts except the SV interrupt.

As the CCU 450 services this transfer process over time duration $t_2$ to $t_4$, one or more SYSCOM interrupts can start coming in from PU's 451-454, at say, intermediate time point, $t_{3a}$. The SVP detects the one or more interrupts, masks out all SYSCOM interrupts, and stores an indicator indicating that at least one SYSCOM interrupt was detected. The indicator also identifies which of the SYSCOM interrupts is to be next-serviced, according to its priority. But then, instead of servicing the SYSCOM interrupt, the SVP continues to service the system operator-requested line transfer by turning clocks back on at time point $t_{3b}$.

At time point $t_4$, the SC completes the line transfer task and issues an SV interrupt which halts MF clocks and alerts the SVP 420.

The SVP 420 then switches into a special mode where it recalls the indicator it stored at time $t_{3a}$, it then recognizes one not-yet serviced SYSCOM interrupt which posted at time $t_{3a}$ and it services only that one SYSCOM interrupt over time span $t_4$ to $t_5$. (More SYSCOM interrupts can post during this time.) After servicing the one SYSCOM interrupt, the SVP unmasks all the SYSCOM interrupts (so that more can post) and asks the CCU 450 to transfer a next line of operator data during time span $t_5$ to $t_7$. More SYSCOM interrupts can post at, for example, time point $t_{6a}$. The newly posted SYSCOM interrupt requests are handled as before. A record is made of their occurrence, they are not yet serviced, and at time point $t_{6b}$, the SVP turns system clocks back on to complete servicing of the one block of system-operator data then being transferred. The transfer completes at time point $t_7$ and clocks shut off. Then, between time span $t_7$-$t_8$, the SVP allows itself to service just one of the posted SYSCOM interrupts before returning to service yet another line of operator data. This process repeats until either there are no more lines of operator data to transfer or no more SYSCOM interrupts.

The overall effect is that SC servicing of operator initiated data transfers and SVP initiated processes are interlaced as seen in FIG. 6C. This interlacing of processes is believed to better replicate the conditions which occur during nondeterministic runs. It is believed to be useful in debugging error conditions which arise from side effects of process interlacing.

It is seen from the above that a simple method for having the SVP 420 service one MF initiated request at a time is provided in a multi-tasking or multi process environment and that deterministic behavior is preserved from one run to the next.

The above disclosure is to be taken as illustrative of the invention, not as limiting its scope or spirit. Numerous modifications and variations will become apparent to those skilled in the art after studying the above disclosure.

By way of example, SVP inputs to the mainframe can enter through direct connections rather than going through the scan bus 425. The scan bus 425 is merely the preferred manner for carrying signals back and forth between the SVP 420 and various scannable points within the mainframe 410. The invention encompasses all means for inputting signals that are potentially behavior-changing into a synchronous main system from a relatively non-synchronous external system. Deterministic behavior will be maintained in the main system as long as the same externally supplied input signals arrive at the same machine cycles of the main system, one run after the next. It is up to system designers to decide which main system clock cycles will be the unique clock cycles when the main system enters a self-induced sleep state and what specific inputs should be introduced from external non-synchronous systems during the self-induced sleep states of the main system.

The term "interrupt," as used above, should not be limited to hardware interrupts. When it is stated that a signal acts as an interrupt, the recognition of such an interrupt can be implemented with periodic software polling or with a hardware driven process. Determinism is maintained as long as inputs to the main system arrive at the same clock cycles one run after the next. It does not matter how long it takes for the main system to react, it does not matter whether the main system is running full speed or is being single stepped during various parts of its operations and it does not matter that the reactions of the main and secondary systems to one another are in part due to hardware or software initiated signals or a combination of both.

Given the above disclosure of general concepts and specific embodiments, the scope of protection sought here is to be defined by the following claims.

What is claimed is:

1. A structure for maintaining deterministic behavior in a first system whose operations are synchronized by clock pulses of a first clock, where the first system responds to input signals from a second system and operations of the second system are not synchronized by the clock pulses of the first clock, the structure comprising:

clock control means for receiving clock stop commands and clock restart commands and correspondingly stopping and restarting the supply of clock pulses to the first system;

event anticipating means for anticipating that a unique event corresponding to a unique cycle of the first clock will occur in the first system within a predefined amount of time, where said unique event includes receipt of a response-inducing input signal from the second system, the response inducing signal being one which induces a change of behavior in the first system;

information generating means, responsively coupled to the event anticipating means, for generating event information identifying the upcoming unique event when such an event is anticipated by the event anticipating means;

clock stop means, operatively coupled to the event anticipating means, for issuing a clock stop command to the clock control means just before the occurrence of the unique event so that synchronous operations in the first system come to a halt at the beginning of the unique clock cycle;

event service means, located in the second system and coupled to the clock stop means and the information generating means, for detecting the issuance of a clock stop command, for collecting the event information and determining therefrom which unique event has occurred in the first system and for loading a corresponding one or more response inducing input signals into the first system while clock pulses are not supplied to the first system; and restart means, coupled to the event service means, for issuing a restart command to the clock control means after the event service means has loaded the corresponding one or more response-inducing input signals.

2. The determinism maintaining structure of claim 1 wherein the information generating means includes event-information storing means whose contents are readable by the event servicing means while the supply of clock pulses from the first clock to the first system is stopped, the information generating means being provided for storing the generated event information.

3. The determinism maintaining structure of claim 1 wherein the first system further includes:

an input-receiving buffer, operatively coupled to the event servicing means of the second system, for receiving the one or more response-inducing input signals loaded by said event service means while the supply of clock pulses from the first clock to the first system is stopped, and a valid-data latch, operatively coupled to the event servicing means of the second system, for receiving and storing a data-valid signal generated by said event service means to indicate that the one or more response-inducing input signals have been loaded into the input-receiving buffer.

4. The determinism maintaining structure of claim 3 further comprising a blockadable channel coupling the second system to the valid-data latch of the first system where opening and closing of the blockadable channel is controlled by the second system and the second system keeps the channel closed while clock pulses are supplied to the first system so that the data-valid latch cannot receive the data-valid signal while the first system receives clock pulses.

5. The determinism maintaining structure of claim 4 wherein:

the first system includes scannable latches defining said data-valid latch and said input-receiving buffer;

the second system includes scan means for detecting states of predefined monitor points in the first system, for addressing the scannable latches of the first system and for setting or resetting the states of these scannable latches when they are addressed;

the blockadable channel includes a scan bus for carrying scan address signals addressing the scannable latches of the first system; and the second system further includes blockading means for blocking the scan means from addressing the valid-data latch while the first system receives clock pulses, thereby keeping the blockadable channel closed with respect to the data-valid latch while clock pulses are supplied to the first system.

6. The determinism maintaining structure of claim 1 wherein the event anticipating means includes:

event initiating means, operating synchronously with said first clock, for initiating at least one unique event at the beginning of a corresponding unique cycle of the first clock.

7. The determinism maintaining structure of claim 6 wherein:

the event initiating means includes means for sending an initiating signal to the second system at the beginning of the unique cycle requesting transference of a response-inducing input signal from the second system to the first system; and the second system includes interrupt detect means, operatively coupled to receive the initiating signal from the event initiating means, for interrupting the second system upon receipt of said initiating signal and forcing said event service means of the second system to load a corresponding one or more of the response-inducing input signals into the first system.

8. The determinism maintaining structure of claim 6 wherein:

the event initiating means includes plural units, each unit having independent means for issuing an initiating signal to the second system at the beginning of the unique cycle requesting transference of corresponding response-inducing input signals from the second system to the first system.

9. The determinism maintaining structure of claim 8 wherein:

the event service means of the second system includes prioritizing means for selecting one of plural initiating signals issued from said plural units of the event initiating means as the one to be next serviced on a first-come, first-served basis.

10. A structure for maintaining deterministic behavior in a first system whose operations are synchronized by clock pulses of a first clock, where the first system responds to input signals from a second system and operations of the second system are not synchronized by the look pulses of the first clock, the structure comprising:

clock control means for receiving clock stop commands and clock restart commands and correspondingly stopping and restarting the supply of clock pulses to the first system;

blocking means, coupled to the second system and the clock control means, for blocking the transfer of behavior-changing input signals from the second system into the first system while clock signals are supplied to the first system, said behavior-changing input signals being ones which can induce changes in the behavior of the first system once their introduction into the first system is recognized by the first system; and transfer coordinating means, for issuing clock stop commands to the clock control means at prespecified cycles of the first clock, for transferring prespecified ones of the behavior-changing input signals from the second system into the first system while clock signals are not supplied to the first system, and for issuing clock restart commands to the clock control means at the end of each such transfer thereby enabling the first system to respond to the transferred signals.

11. A method for maintaining deterministic behavior in a first system whose operations are synchronized to clock cycles of a first clock, where the first system is forced to respond within a predefined number of clock cycles to behavior-changing commands supplied by a second system and where operations of the second system are not synchronized to the clock cycles of the first clock, the method comprising the steps of:

blocking the second system from sending behavior-changing commands to the first system until the occurrence of a prespecified clock cycle of the first clock;

halting the first clock at the beginning of the prespecified clock cycle;

signalling the second system of the occurrence of said clock halting step;

sending behavior-changing commands from the second system to the first system while the first clock is halted at the beginning of the prespecified clock cycle; and restarting the first clock after said sending step.

12. An apparatus for maintaining deterministic behavior in a first system, where operations of the first system are synchronized to clock cycles of a first clock, where the first system responds to behavior-changing commands supplied by a second system within a predefined number of clock cycles or predefined amount of time after such commands are received and where operations of the second system are not synchronized to the clock cycles of the first clock, said apparatus comprising:

blocking means for blocking the second system from sending behavior-changing commands to the first system until the occurrence of a prespecified clock cycle of the first clock;

halting means for halting the first clock at the beginning of the prespecified clock cycle;

signalling means for signalling the second system of the occurrence of said clock halting function;

sending means for sending behavior-changing commands from the second system to the first system while the first clock is halted at the beginning of the prespecified clock cycle; and restarting means for restarting the first clock after said sending function.

13. A de-glitching circuit for use in coupling a first synchronous system to a second system where the second system is not synchronous with the first system, said de-glitching circuit comprising:

a K input terminal for receiving system clock pulses of the first system, each of said pulses including a transition-inducing edge which induces transitions in one or more signals within the first system;

a D input terminal for receiving a data signal from within the first system, said data signal being subject to contamination by noise spikes which align with the transition-inducing edges of the system clock pulses;

a Q output terminal for outputting a spike-free version of the received data signal;

signal transferring means, for transferring a signal level present at the D input terminal to the Q output terminal only at the time of the transition-inducing edges of the system clock pulses, the signal transferring means having an enable input for selectively enabling or disabling such transfer; and spike-transfer suppressing means, coupled to the enable input of the signal transferring means, for disabling the transfer function of the signal transferring means if the signal levels present at the D and Q terminals are not different prior to the time of a transition-inducing edge.

14. A de-glitching circuit according to claim 13 wherein the signal transferring means is a clocked latch.

15. A de-glitching circuit according to claim 13 wherein the spike-transfer suppressing means includes an exclusive OR gate.

* * * * *

UNITED STATES PATENT AND TRADEMARK OFFICE
CERTIFICATE OF CORRECTION

PATENT NO. : 5,297,276
DATED : March 22, 1994
INVENTOR(S) : James P. Millar et al.

It is certified that error appears in the above-indentified patent and that said Letters Patent is hereby corrected as shown below:

```
Column 33, line 67, insert a hyphen (-) after "response".
Column 35, line 33, "look" should be --clock--.
```

Signed and Sealed this

Twenty-first Day of May, 1996

Attest:

BRUCE LEHMAN

*Attesting Officer*     Commissioner of Patents and Trademarks